United States Patent
Naka

[19]

[11] Patent Number: 5,813,743
[45] Date of Patent: Sep. 29, 1998

[54] LIGHTING UNIT

[75] Inventor: Yoji Naka, Kanagawa-ken, Japan

[73] Assignee: Fuji Photo Film Co., Ltd., Kanagawa-ken, Japan

[21] Appl. No.: 621,935

[22] Filed: Mar. 26, 1996

[30]     Foreign Application Priority Data

Mar. 27, 1995  [JP]  Japan ................................ 7-068194
Mar. 27, 1995  [JP]  Japan ................................ 7-068195

[51] Int. Cl.$^6$ ................................................ G03B 15/02
[52] U.S. Cl. ........................... 362/16; 362/327; 362/329; 362/308
[58] Field of Search ............................ 362/16, 327, 329, 362/309, 336, 335, 308, 223; 396/176

[56]         References Cited

U.S. PATENT DOCUMENTS

| | | | |
|---|---|---|---|
| 1,977,689 | 10/1934 | Muller | 362/327 |
| 2,254,961 | 9/1941 | Harris | 362/327 |
| 2,254,962 | 9/1941 | Harris et al. | 362/327 |
| 2,356,654 | 8/1944 | Cullman | 362/223 |
| 2,469,080 | 5/1949 | Rosin et al. | 362/327 |
| 2,908,197 | 10/1959 | Wells et al. | 362/327 |
| 5,160,192 | 11/1992 | Sugawara | 362/16 |

*Primary Examiner*—Thomas M. Sember
*Attorney, Agent, or Firm*—Young & Thompson

[57]            ABSTRACT

In a lighting unit for projecting forward diverging light emitted from a light source, a prism is disposed forward of the center of the light source. The prism has a first light incident surface through which light emanating obliquely forward from the light source enters the prism, a total reflection surface which reflects forward in total reflection light passing through the first light incident surface, a second light incident surface which is a positive refracting surface and through which light emanating mainly forward from the light source enters the prism and a light emanating surface through which light passing through the second light incident surface and light reflected by the total reflection surface emanate from the prism. A reflecting mirror reflects mainly forward light emanating sideways and rearward from the light source.

14 Claims, 19 Drawing Sheets

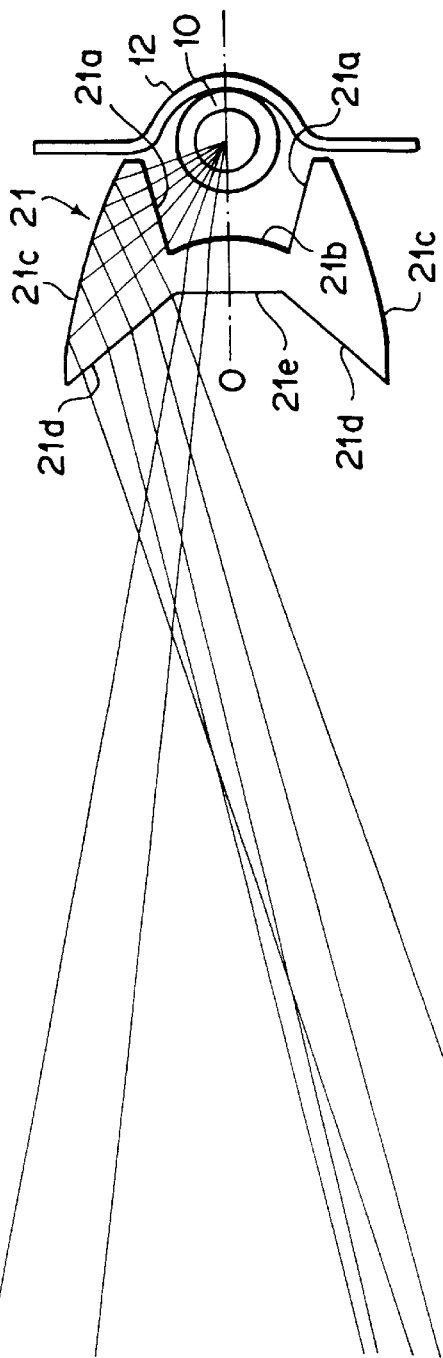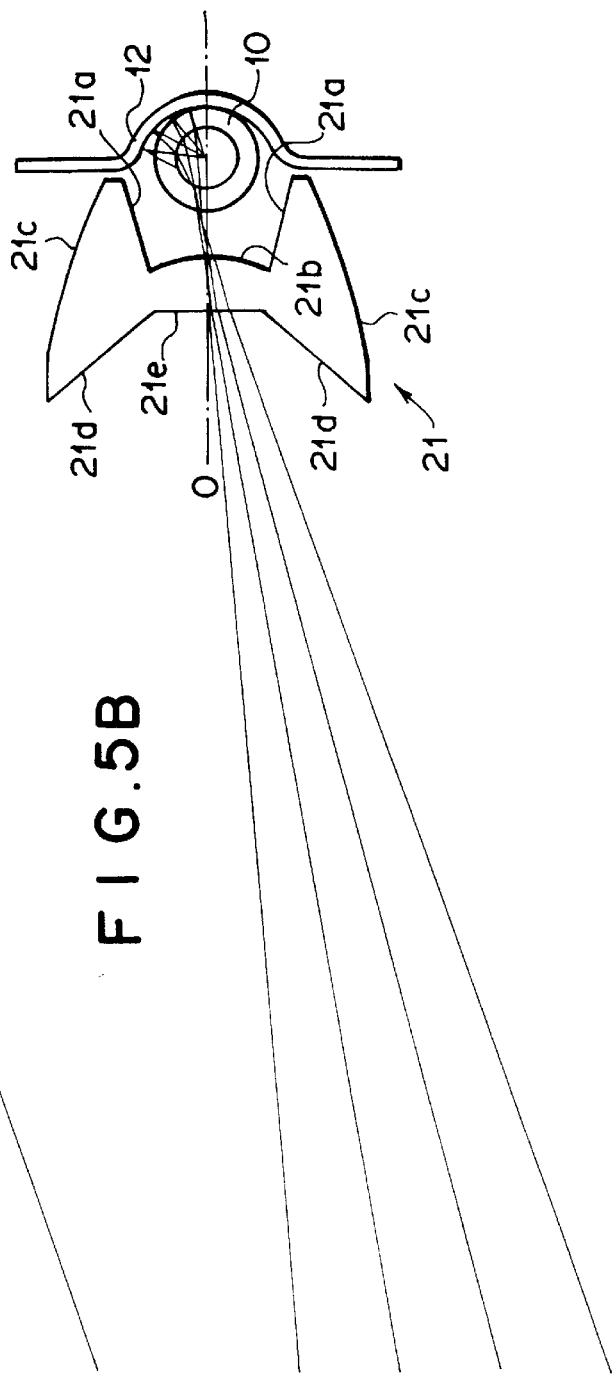
FIG. 5A
FIG. 5B

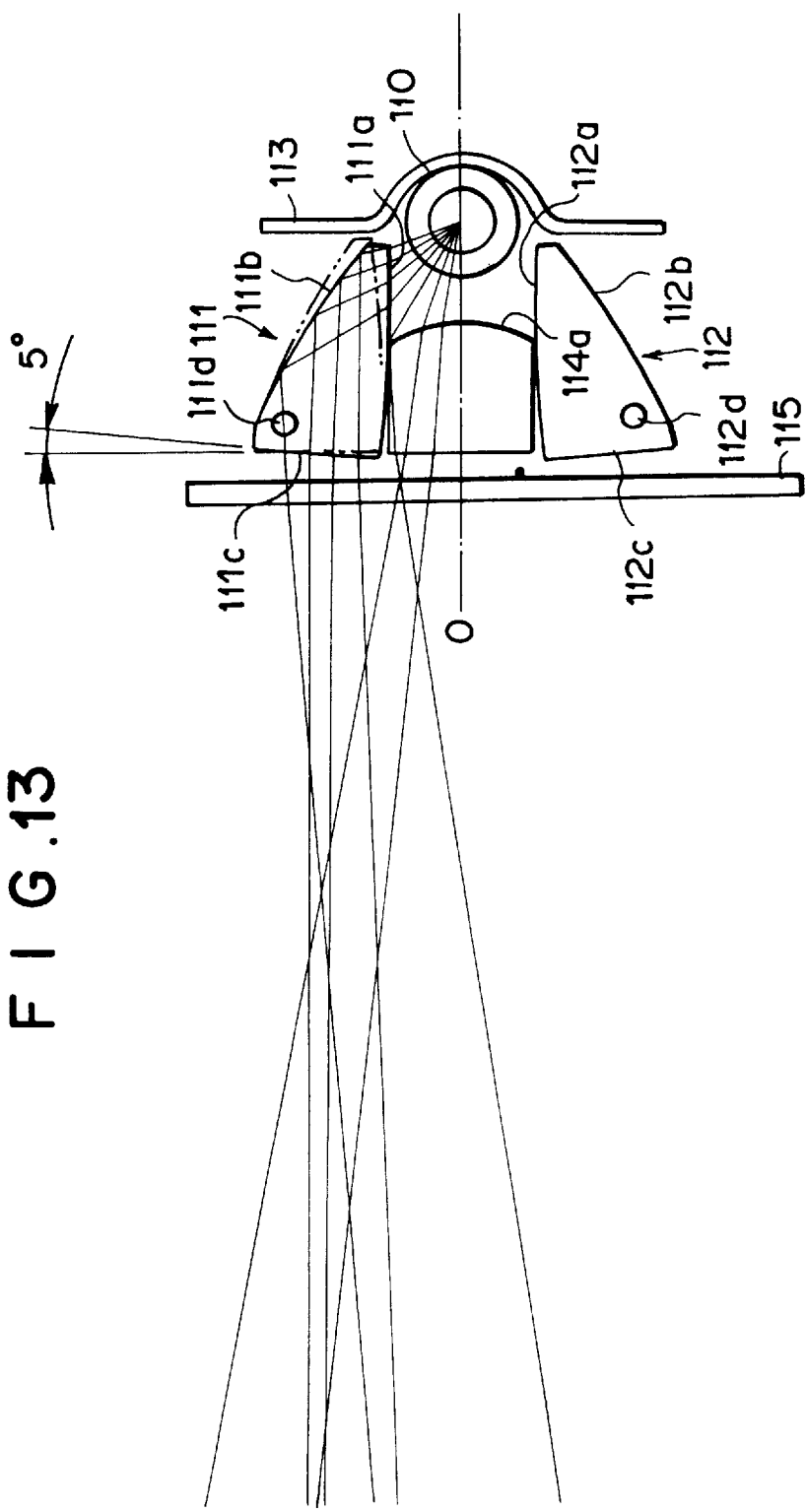
F I G. 13

F I G. 15
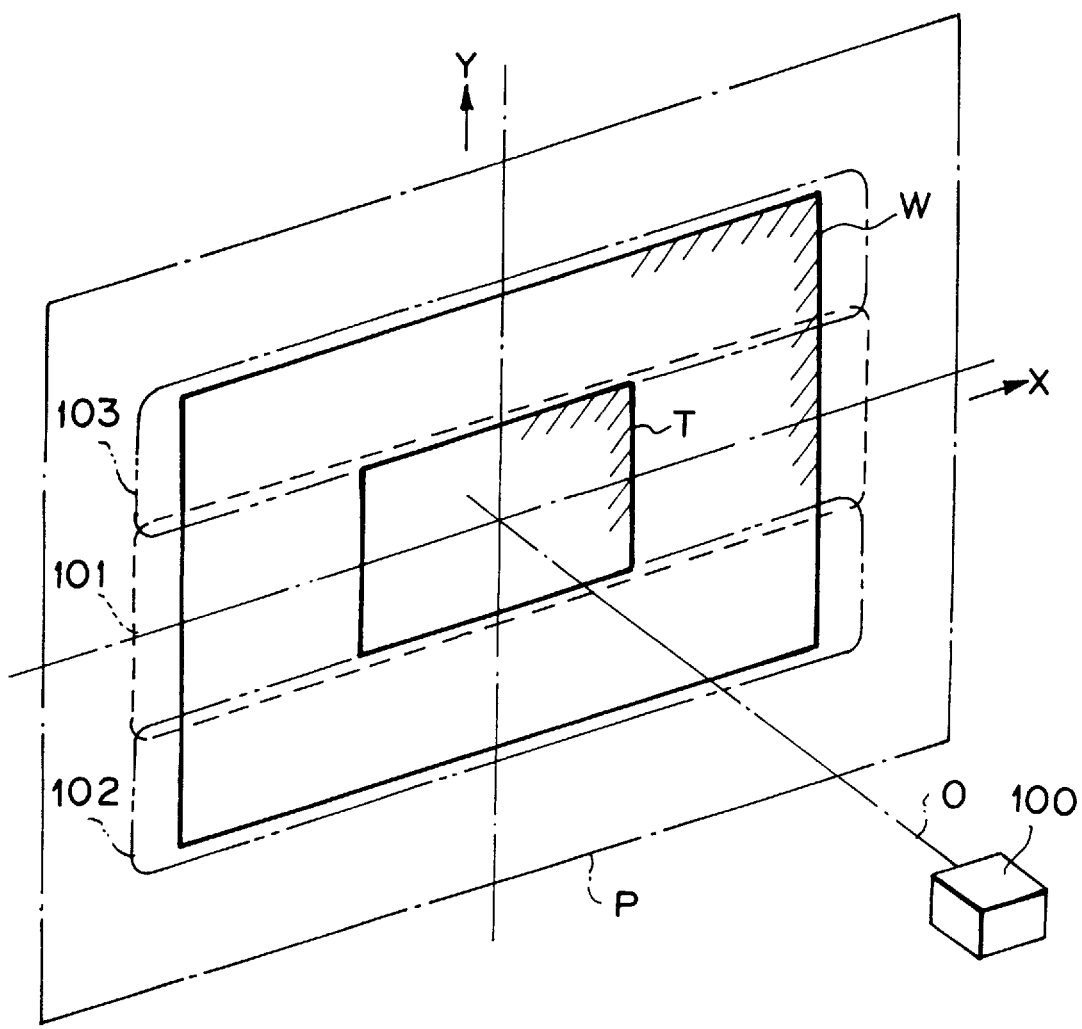

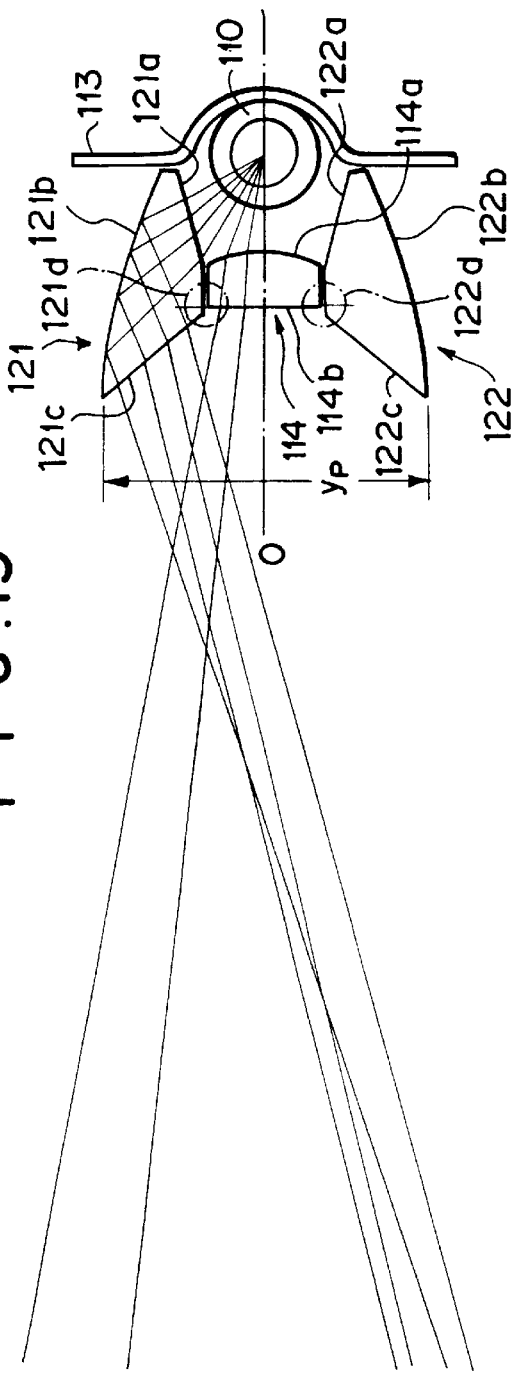
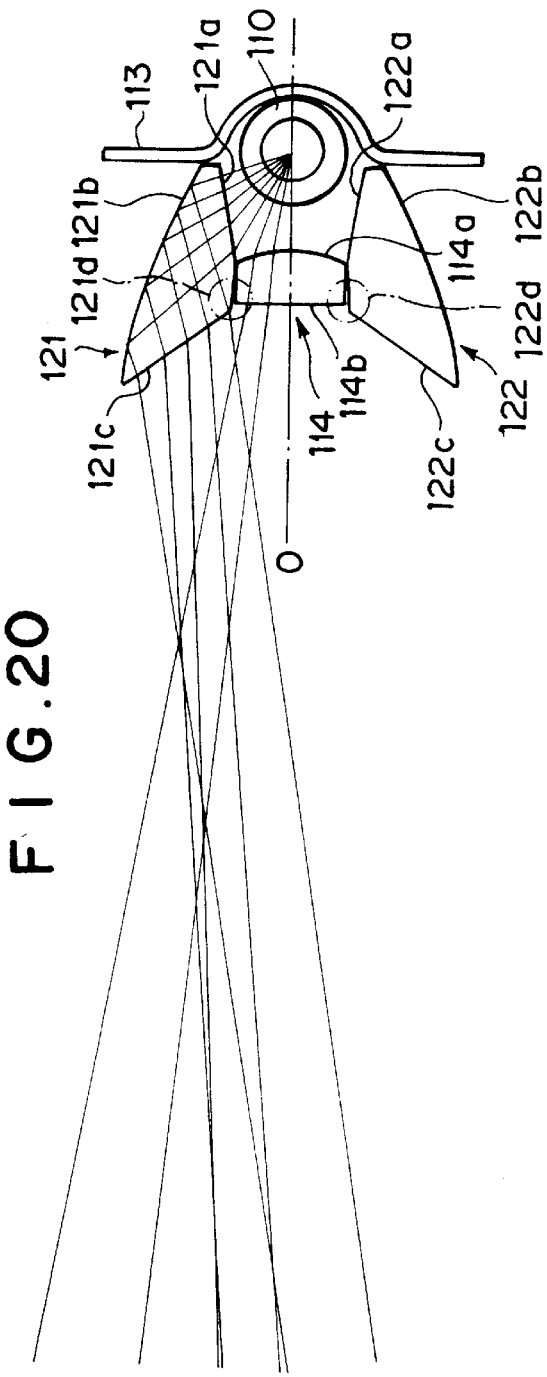

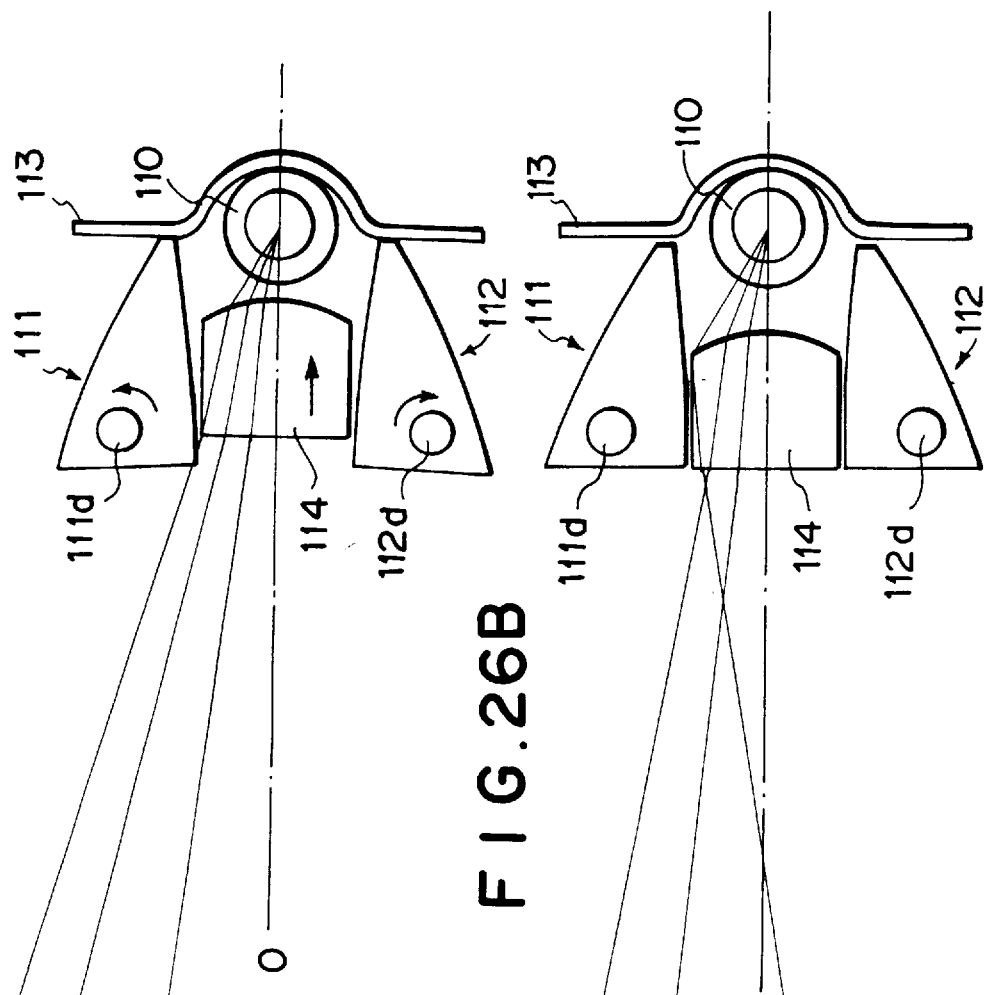

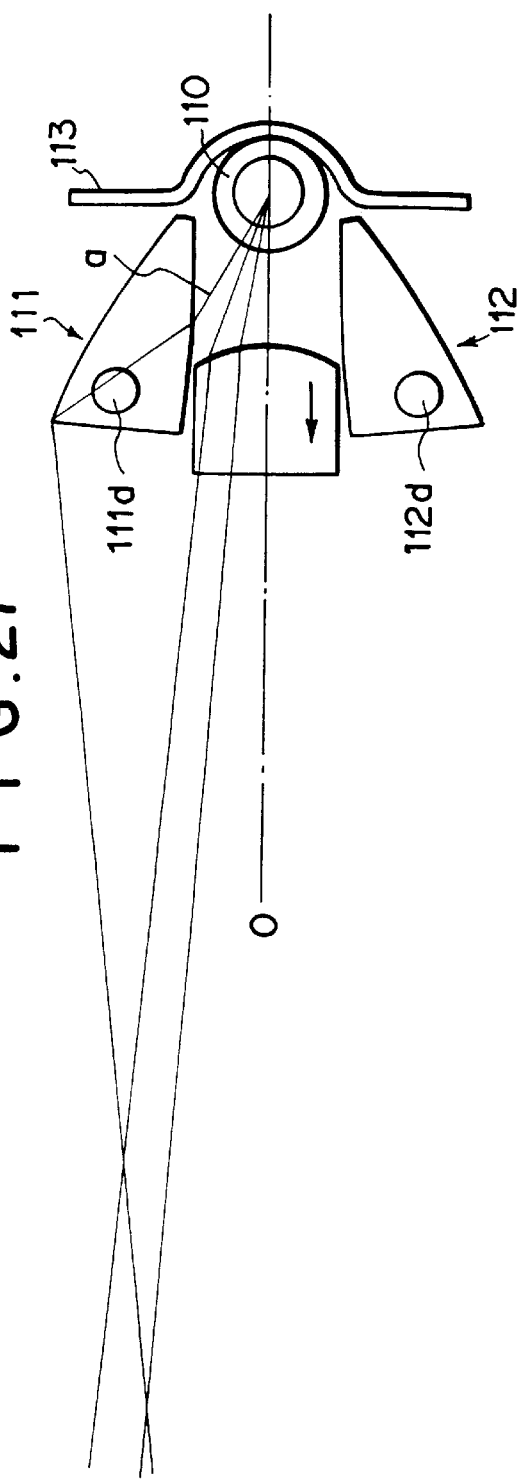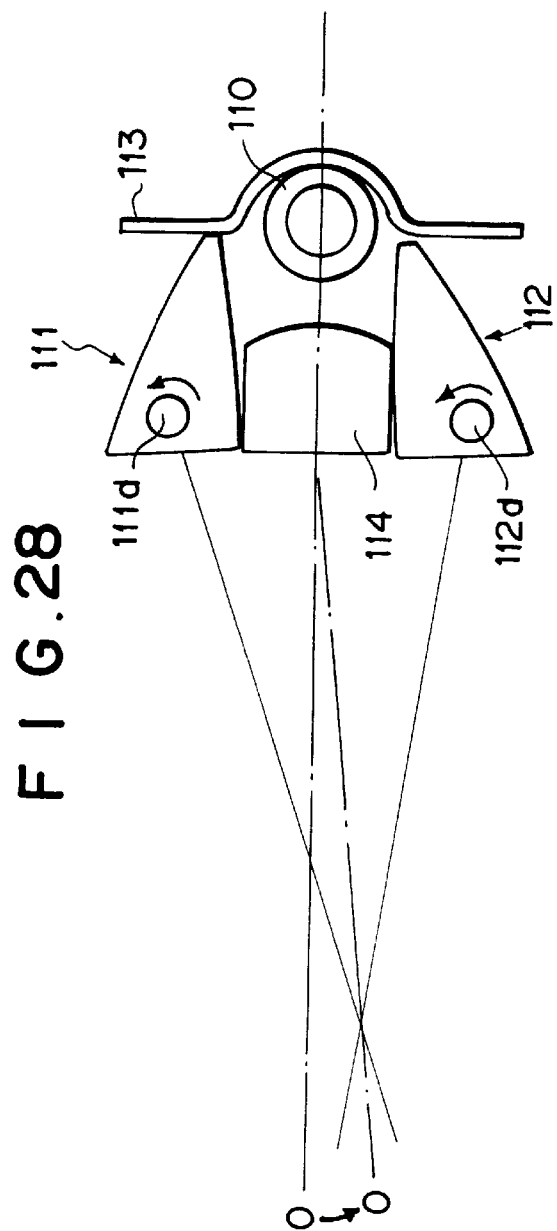

LIGHTING UNIT

BACKGROUND OF THE INVENTION

1. Field of the Invention

This invention relates a lighting unit for use, for instance, in a photographic camera.

2. Description of the Related Art

A stroboscope for use in a photographic camera and the like basically comprises a light source and optical elements such as a reflecting mirror, a prism and the like for leading forward diverging light emitted from the light source.

In such a lighting unit, in order to condense light emitted from the light source within a desired angle of view as much as possible, various structures have been proposed.

For example, the structure disclosed in Japanese Unexamined Patent Publication No. 4(1992)-138438 employs a prism having a total reflection surface which reflects forward light emanating sideways and rearward from the light source, and the structure disclosed in Japanese Patent Publication No. 6(1994)-10712 employs a reflecting mirror extended (toward an object).

However the former structure is disadvantageous in that the lighting unit cannot be sufficiently miniaturized since a part of a light incident surface (through which light emanating from the light source enters the prism and is refracted toward the total reflection surface) of the prism extends to the rear of the light source.

The latter structure is disadvantageous in that the reflecting mirror must be long to increase light condensing efficiency, which results in a larger size of the lighting unit.

Further in the lighting unit for a photographic camera, there has been a problem that when the light projecting angle of the lighting unit over which the light is projected is greatly different from the angle view of the camera, the amount of projected light becomes insufficient in a peripheral portion within the angle of view or a large amount of light is projected outside the angle of view and the efficiency of utilization of light emanating from the light source is deteriorated.

Accordingly there have been proposed various lighting units in which the light projecting angle is variable.

For example, in the lighting unit disclosed in Japanese Unexamined Patent Publication No. 4(1992)-138439, a light source is moved in the direction of the optical axis of the projected light relative to a prism having a total reflection surface which reflects forward light emanating sideways and rearward from the light source and a reflecting member disposed outside the prism.

The lighting unit disclosed in Japanese Unexamined Patent Publication No. 6(1994)-160947 comprises a condensing Fresnel lens having an opening which a reflecting mirror with a light source can pass through and another Fresnel lens disposed forward of the condensing Fresnel lens, and the reflecting mirror and the light source are moved in the direction of the axis of the opening in the condensing Fresnel lens, i.e., in the direction of the optical axis of the projected light.

In the lighting unit disclosed in Japanese Patent Publication Nos. 5(1993)-29895 and 62(1987)051453 and Japanese Unexamined Patent Publication No. 6(1994)-138522, the inclination of a reflecting mirror is changed.

The first structure is disadvantageous in that since the reflecting member is disposed outside the prism, the lighting unit becomes large in size and cost is increased.

The second structure is disadvantageous in that the light source and the reflecting mirror must be moved by a large distance and a pair of Fresnel lenses large in diameter are required, which results in a large size of the lighting unit.

Further the third structure is disadvantageous in that since the lighting unit has no means for separately controlling light directly traveling toward the object from the light source, so freedom in setting distribution of light is limited.

SUMMARY OF THE INVENTION

In view of the foregoing observations and description, the primary object of the present invention is to provide a lighting unit which can condense light with a high efficiency and can be sufficiently small in size.

Another object of the present invention is to provide a lighting unit which can be small in size and in which a large zooming effect (change in projecting angle) can be obtained by a small amount of movement.

In accordance with a first aspect of the present invention, there is provided a lighting unit for projecting forward diverging light emitted from a light source comprising a prism which has a first light incident surface through which light emanating obliquely forward from the light source enters the prism, a total reflection surface which reflects forward in total reflection light passing through the first light incident surface, a second light incident surface which is a positive refracting surface and through which light emanating mainly forward from the light source enters the prism and a light emanating surface through which light passing through the second light incident surface and light reflected by the total reflection surface emanate from the prism, and is disposed forward of the center of the light source, and a reflecting mirror which reflects mainly forward light emanating sideways and rearward from the light source.

It is preferred that the light emanating surface of the prism comprises a first light emanating surface through which light reflected by the total reflection surface mainly emanates and a second light emanating surface through which light passing through the second light incident surface mainly emanates and the first light emanating surface be inclined relative to the optical axis of projected light so that the overall light emanating surface is concave in cross-section.

It is preferred that the first light incident surface of the prism be inclined at 2° to 30° relative to the optical axis of projected light.

Further it is preferred that the following conditions are satisfied $$D/2 \leq x_r \leq D \ D < y_r \leq 2D$$

wherein $x_r$ and $y_r$ respectively represent the depth and width of the effective area of the reflecting mirror and D represents the diameter of the light source.

Further it is preferred that the width $y_{p1}$ of the first light incident surface of the prism at the light source side extreme point be within the range of $$D \leq y_{p1} \leq 2D$$

wherein D represents the diameter of the light source.

Further it is preferred that the light emanating surface of the prism be exposed as a part of the outer surface of the camera.

In the lighting unit of this aspect, light emanating mainly forward from the light source enters the prism through the second light incident surface, is condensed by the second light incident surface which is a positive refracting surface and emanates forward. Light emanating obliquely forward from the light source enters the prism through the first light incident surface and is reflected in total reflection by the total reflection surface to emanate forward. Further light emanating sideways or rearward impinges upon the reflecting mirror and is reflected mainly forward. Accordingly though the prism is disposed forward of the center of the light source, the light condensing efficiency is not deteriorated.

Thus in the lighting unit of this aspect, light emanating sideways or rearward from the light source is reflected mainly forward by the reflecting mirror which can be thin and the prism is disposed forward of the center of the light source so that light emanating mainly forward or obliquely forward only enters the prism. Accordingly the front end of the prism can be low and the prism may be small in size, whereby the width of the lighting unit may be small, whereby the lighting unit can be small in size.

Since total reflection in the prism is higher in efficiency than reflection at the reflecting mirror, the lighting unit of this aspect can make better use of light emanating from the light source as compared with the conventional lighting unit employing a reflecting mirror.

Further since light emanating obliquely forward from the light source impinges upon the total reflection surface after refracted by the first light incident surface of the prism, the total reflection surface may be relatively small, the prism may be small also in this regard, whereby the overall size of the lighting unit can be further small.

Further in the lighting unit of this aspect, distribution of light can be easily controlled by changing the shape of the prism.

In accordance with a second aspect of the present invention, there is provided a lighting unit for projecting forward diverging light emitted from a light source comprising a condenser lens which condenses light emanating mainly forward from the light source, a pair of prisms which are disposed on opposite sides of the condenser lens to be variable in its inclination relative to the optical axis of projected light and each of which has a light incident surface through which light emanating obliquely forward from the light source enters the prism, a total reflection surface which reflects forward in total reflection light passing through the light incident surface, and a light emanating surface through which light reflected by the total reflection surface emanates from the prism, and a reflecting mirror which reflects mainly forward light emanating substantially rearward from the light source.

It is preferred that no light reflecting member is disposed on the outer side of each of the prisms.

In one embodiment, the lighting unit further comprises a drive member for changing the inclination of the prisms interlocked with a zooming mechanism of a taking lens of a camera.

In the lighting unit of the second aspect, light emanating mainly forward from the light source is condensed by the condenser lens and illuminates a central portion of the light projecting angle range of the lighting unit. Light emanating obliquely forward from the light source passes the prisms and emanates forward therefrom. The direction of light emanating from the prisms can be changed by changing the inclination of the prisms relative to the optical axis of projected light.

Accordingly when the inclination of the prisms is set so that light emanating therefrom illuminates a portion the same as or near the portion illuminated by light emanating from the condenser lens, the projecting angle of the lighting unit becomes narrow, which is suitable when the focal length of the taking lens is long and the angle of view is narrow. On the other hand, when the inclination of the prisms is set so that light emanating therefrom illuminates opposite sides of the portion illuminated by light emanating from the condenser lens, the projecting angle of the lighting unit becomes large, which is suitable when the angle of view of the taking lens is wide.

Further since light emanating substantially rearward from the light source is reflected by the reflecting mirror to enter the condenser lens or the prisms, the light condensing efficiency can be high. Further since total reflection in the prism is higher in efficiency than reflection at the reflecting mirror, the lighting unit of this aspect can make better use of light emanating from the light source as compared with the conventional lighting unit employing a reflecting mirror.

As can be understood from the description above, in the lighting unit of this aspect, since the projecting angle is changed by changing the inclination of the prisms relative to the optical axis of projected light, a larger zooming effect can be obtained with a small amount of movement as compared with in the conventional lighting unit where the projecting angle is changed by moving the light source and the reflecting mirror in the direction of the optical axis, and accordingly the lighting unit of this aspect can be smaller in size.

Further in the lighting unit of this aspect, since light emanating mainly forward and light emanating obliquely forward are directed in respective desire directions by the lens and the prisms, respectively, the projecting angle can be efficiently changed.

When no light reflecting member is disposed on the outer side of each of the prisms, the lighting unit can be further small in size.

When the lighting unit further comprises a drive member for changing the inclination of the prisms interlocked with a zooming mechanism of a taking lens of a camera, an optimal projecting angle can be automatically obtained by zooming the taking lens.

BRIEF DESCRIPTION OF THE DRAWINGS

FIG. 5A is a side view of an important part of a stroboscope in accordance with a second embodiment of the present invention showing paths of light which emanates from the light source and enters the prism, FIG. 5B is a side view similar to FIG. 5A but showing paths of light which emanates from the light source and impinges upon the reflecting mirror, FIG. 13 is a side view of the stroboscope of the seventh embodiment in a state where the projecting angle is narrow, FIG. 15 is a view showing the relation between the light projecting area by the stroboscope on an object surface and angle of view of the zoom lens.

FIG. 19 is a side view of a stroboscope of in accordance with an eighth embodiment of the present invention in a state where the projecting angle is wide, FIG. 20 is a side view of the stroboscope of the eighth embodiment in a state where the projecting angle is narrow, FIG. 26A is a side view of a stroboscope in accordance with a tenth embodiment of the present invention in a state where the projecting angle is wide, FIG. 26B is a side view of the stroboscope of the seventh embodiment in a state where the projecting angle is wide, FIG. 27 is a side view of the stroboscope of the tenth embodiment in a state where the projecting angle is narrow, and FIG. 28 is a side view of a stroboscope in accordance with an eleventh embodiment of the present invention.

DESCRIPTION OF THE PREFERRED EMBODIMENTS

Figure 1:
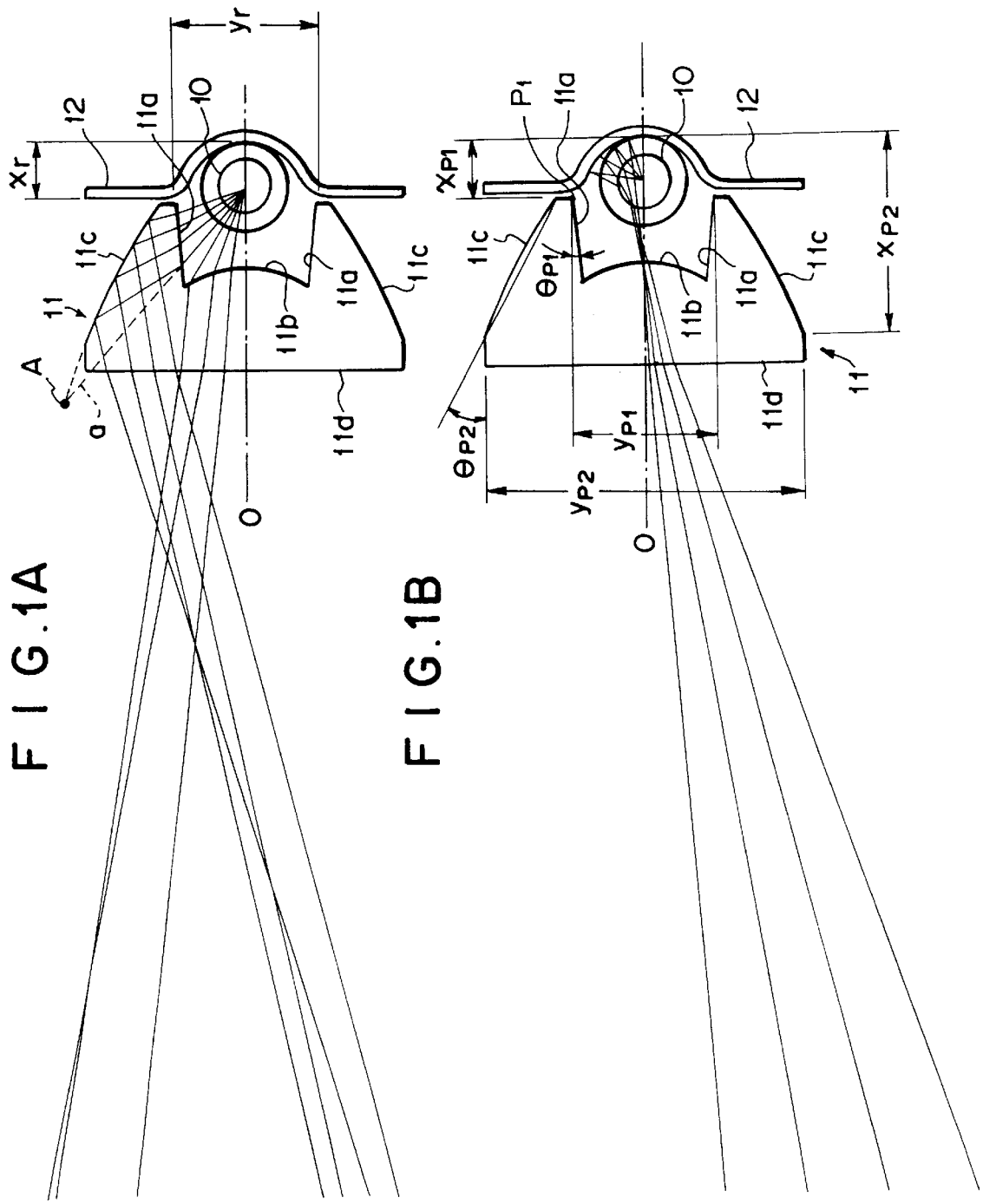
FIG. 1A is a side view of an important part of a stroboscope in accordance with a first embodiment of the present invention showing paths of light which emanates from the light source and enters the prism.
FIG. 1B is a side view similar to FIG. 1A but showing paths of light which emanates from the light source and impinges upon the reflecting mirror.
Figure 2:
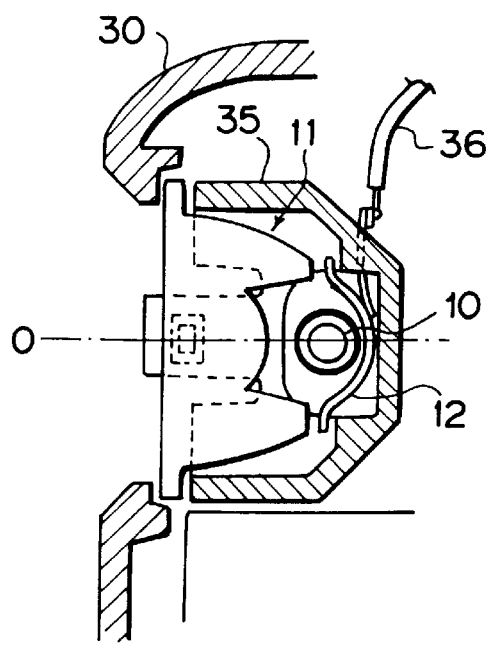
FIG. 2 is a side view partly in cross-section of the stroboscope of the first embodiment.
Figure 3:
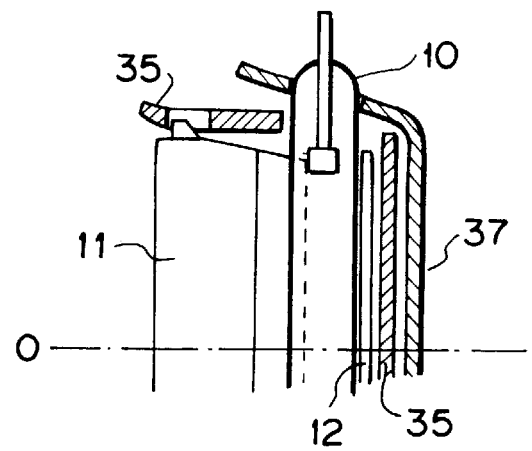
FIG. 3 is a plan view partly in cross-section of the stroboscope of the first embodiment.
Figure 4:
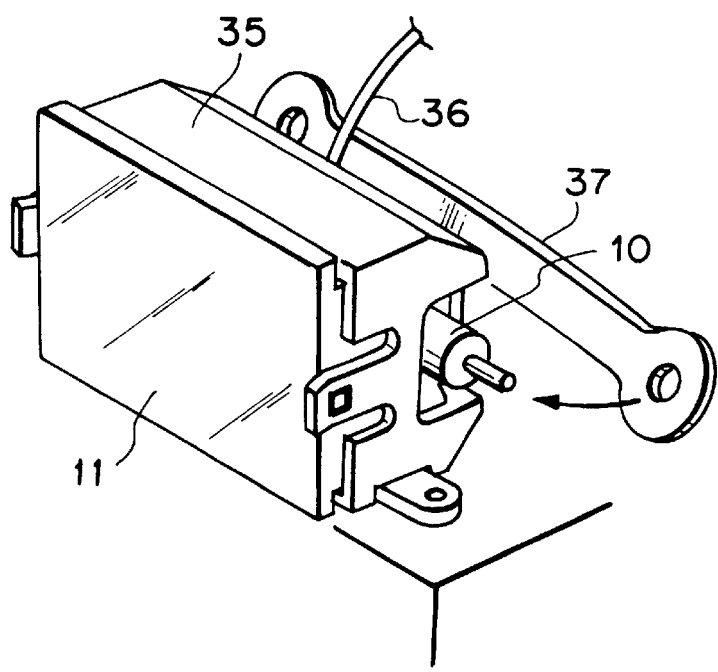
FIG. 4 is a perspective view of the stroboscope of the first embodiment.

In FIGS. 1 to 5, a stroboscope in accordance with a first embodiment of the present invention comprises a light source 10 which may be, for instance, a xenon lamp, a transparent prism 11 disposed forward of the center of the light source 10 and a reflecting mirror 12 which covers the rear and the side of the light source 10. In FIGS. 2 to 4, reference numeral 30 denotes a camera body, reference numeral 35 denotes a casing of the stroboscope, reference numeral 36 denotes a trigger for controlling emission of light and reference numeral 37 denotes a silicone band for holding the light source 10.

As shown in FIGS. 1A and 1B, the prism 11 has a first light incident surface 11a, a second light incident surface 11b which is a positive refracting surface, a total reflection surface 11c and a light emanating surface 11d. As shown in FIG. 1A, light emanating mainly forward from the light source 10 enters the prism 11 through the second light incident surface 11b, is condensed by the second light incident surface 11b and emanates forward, while light emanating obliquely forward from the light source 10 enters the prism 11 through the first light incident surface 11a and is reflected in total reflection by the total reflection surface 11c. The light reflected by the total reflection surface 11c emanates forward through the light emanating surface 11d and impinges upon an object diagonally opposed to the reflecting point across the optical axis O of projected light.

The total reflection surface 11c may be, for instance, an ellipse, an arc, a combination of a plurality of arcs, a flat or a combination of two or more of these shapes in cross-section.

The light emanating obliquely forward impinges upon the total reflection surface 11c after being refracted by the first light incident surface 11a in a direction in which the angle of the light relative to the optical axis O increases. Accordingly the total reflection surface 11c may be relatively small, which contributes in reducing the size of the prism 11. By contrast, when a reflecting mirror such as shown Japanese Patent Publication No. 6(1994)-10712 mentioned above is employed in place of the prism 11, the reflecting mirror has to be extended long forward to point A as shown by the dashed line in FIG. 1A in order to reflect forward a light beam a emanating obliquely forward from the light source 10.

On the other hand, light emanating sideways or rearward from the light source 10 impinges upon the reflecting mirror 12 and is reflected mainly forward. The reflecting mirror 12 may be formed, for instance, of an aluminum plate or a molded member deposited with aluminum. The reflecting mirror 12 may be, for instance, an ellipse, a hyperbola, an arc, a combination of a plurality of arcs, or a combination of two or more of these shapes in cross-section.

Thus in the stroboscope of this embodiment, light emanating sideways or rearward from the light source 10 is mainly reflected forward by the reflecting mirror 12 which is thin, and the prism 11 is disposed forward of the center of the light source 10 and the total reflection surface 11c is small. Accordingly, the height $y_{p2}$ of the prism 11 at its front end may be small and the depth $x_{p2}$ of the unit may be small, whereby the overall size of the stroboscope can be small.

It is preferred that the first light incident surface 11a of the prism 11 be inclined at 2° to 5° to the optical axis O of projected light in view of facilitation of molding and reduction of surface reflection, i.e., improvement of incidence efficiency. However when the inclination $\theta_{p2}$ of the first light incident surface 11a is too large, the light refraction angle at the first light incident surface 11a becomes small and the total reflection surface must be extended forward, which increases the size of the prism 11. Accordingly the inclination $\theta_{p2}$ should be up to 30° at the largest.

Further the depth $x_r$ and the width $y_r$ of the effective part of the reflecting mirror 12 are preferably in the range of $D/2 \leq x_r \leq D$ and $D < y_r \leq 2D$ wherein D represents the diameter of the light source 10.

That is, when $D/2 > x_r$, the prism 11 must be extended rearward and the prism 11 becomes larger. When $x_r > D$, $y_r$ must be increased with increase in $x_r$ as in the conventional reflecting mirror. Since it is preferred that the y be increased keeping the relation $y_r \leq y_{p1}$ with the width $y_{p1}$ of the first light incident surface 11a at the light source side extreme point, increase in the $y_r$ results in increase in the $y_{pi}$, whereby the prism 11 becomes larger in size. Further, in such a case, since the light emanating obliquely forward comes to impinge upon the reflecting mirror 12, the advantage of using the prism 11 is deteriorated.

Further when $D/2 \leq x_r$ is satisfied with $D \geq y_r$, the cross-sectional shape of the reflecting mirror 12 comes to be tapered, that is, the width of the reflecting mirror 12 in cross-section decreases toward the front end thereof, which results in a poor light condensing efficiency. Such a shape of the reflecting mirror 12 is undesirable also in view of production of the mirror 12. When the aforesaid relation of $y_r \leq y_{p1}$ is satisfied with $y_r > 2D$, $y_{p1}$ is increased and the prism 11 becomes larger.

Further it is preferred that the width $y_{p1}$ of the first light incident surface 11a at the light source side extreme point be within the range of $D \leq y_{p1} \leq 2D$. That is when $D > y_{p1}$, it becomes difficult to efficiently lead the light reflected at the reflecting mirror 12 to the second light incident surface 11b. The prism 11 must be disposed at a certain distance from the outer surface of the light source 10 in order to reduce influence of heat generated from the light source 10. The distance between the light source side extreme point P1 and the light source 10 is determined by $x_{p1}$ (FIG. 1) and $y_{p1}$. The distance between the light source side extreme point P1 and the light source 10 suffices for avoiding influence of heat generated from the light source when $y_{p1} = 2D$. Accordingly $y_{p1}$ larger than 2D is advantageous and only increases the size of prism 11.

Though, in this particular embodiment, the reflecting mirror 12 comprises a portion which is semicircular in cross-section and linear portions on opposite sides of the semicircular portion, the linear portions may be omitted.

In the stroboscope of the first embodiment, the portion of the light emanating surface 11d through which the light reflected by the total reflection surface 11c emanates and the portion of the light emanating surface 11d through which the light passing through the second light incident surface 11b emanates are in a plane, and accordingly the light emanating surface 11d can be exposed as a part of the outer surface of the camera.

As the light source 10, a linear lamp elongated in one direction or a spherical lamp may be employed. When the former lamp is employed, an elongated prism 11 extending in the longitudinal direction of the lamp is used. When the latter lamp is employed, a prism 11 symmetric with respect to the optical axis O is used.

The shape of the reflecting mirror 12, the shape and/or the inclination of the total reflection surface 11c, and the shape of the second light incident surface 11b are adjusted so that a desired distribution of light is obtained.

A second embodiment of the present invention will be described with reference to FIGS. 5A and 5B, hereinbelow. In FIGS. 5A and 5B, the elements analogous to those shown in FIG. 1 are given the same reference numerals and will not be described here unless necessary.

The stroboscope of this embodiment mainly differs from that of the first embodiment in the structure of the prism. That is, in the second embodiment, the prism 21 has a first light incident surface 21a, a second light incident surface 21b which is a positive refracting surface, a total reflection surface 21c and a pair of light emanating surfaces 21d and 21e. The inclination $\theta_{p2}$ of the total reflection surface 21c is relatively small so that the height $y_{p2}$ of the prism 21 at its front end can be small.

With this arrangement, however, the projecting angle of the light reflected by the total reflection surface 21c is apt to become too large. This is corrected by the shape of the light emanating surface. That is, the light incident surface of the prism 21 comprises a first light incident surface 21d through which mainly the light reflected in total reflection by the total reflection surface 21c emanates and a second light incident surface 21e through which mainly the light passing through the second light incident surface 21b emanates. The first light emanating surface 21d is inclined relative to the optical axis O of projected light so that the overall light emanating surface is concave in cross-section. Accordingly, the light reflected by the total reflection surface 21c is refracted, when passing through the first light emanating surface 21d, in a direction where the projecting angle decreases.

When the boundary between the first and second light emanating surfaces 21d and 21e is like a valley, dust is apt to gather there. Accordingly the first and second light emanating surfaces 21d and 21e may be connected by way of a suitable curved surface.

Figure 6:
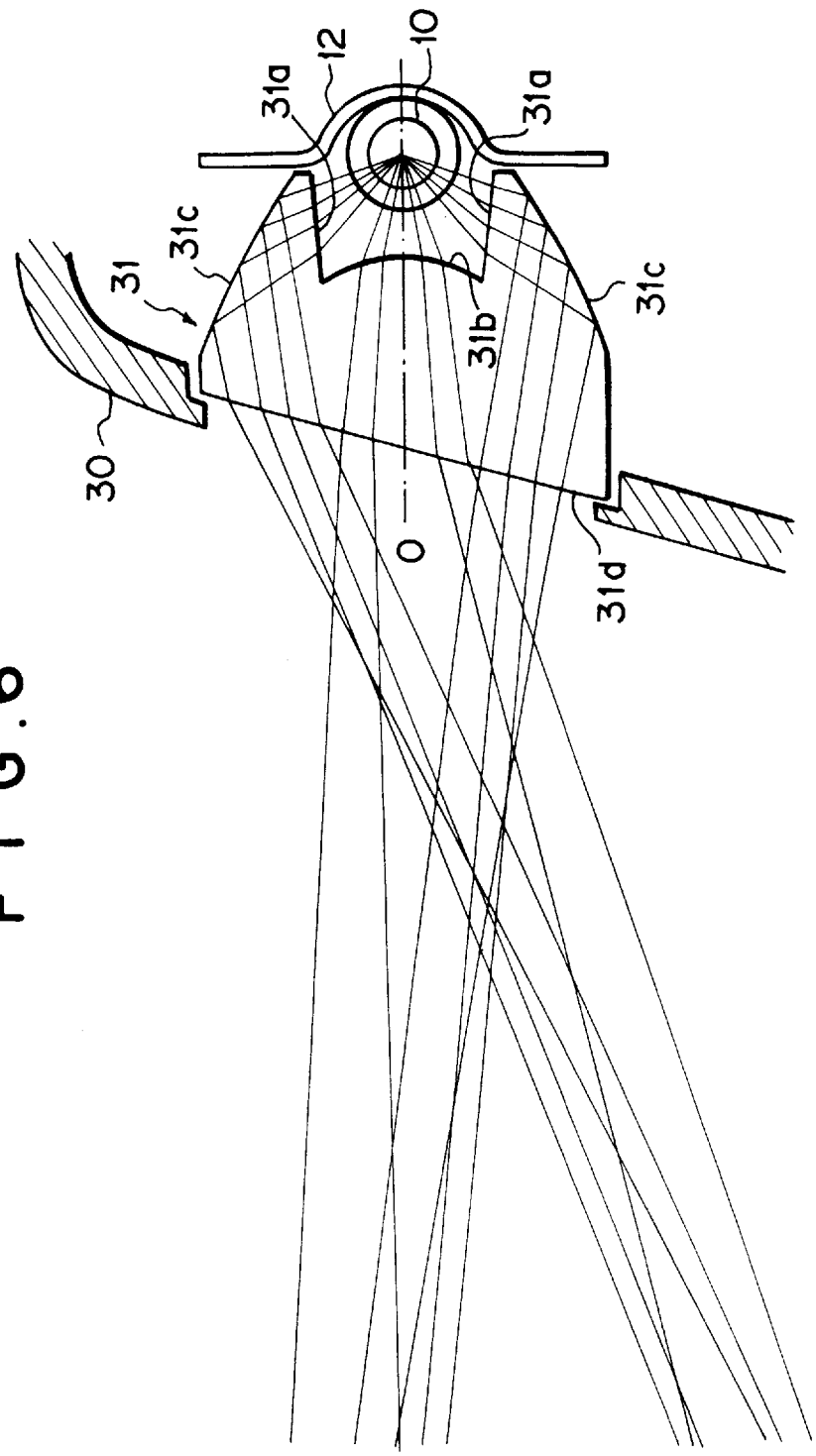
FIG. 6 is a side view of an important part of a stroboscope in accordance with a third embodiment of the present invention.

A third embodiment of the present invention will be described with reference to FIG. 6, hereinbelow. The stroboscope of this embodiment includes a prism 31 which comprises a first light incident surface 31a, a second light incident surface 31b which is a positive refracting surface, a total reflection surface 31c and a light emanating surface 31d and doubles as a protector for protecting a light source 10. The light emanating surface 31d of the prism 31 is inclined relative to the optical axis O of projected light to conform to an inclined front face of the camera body 30.

Figure 7:
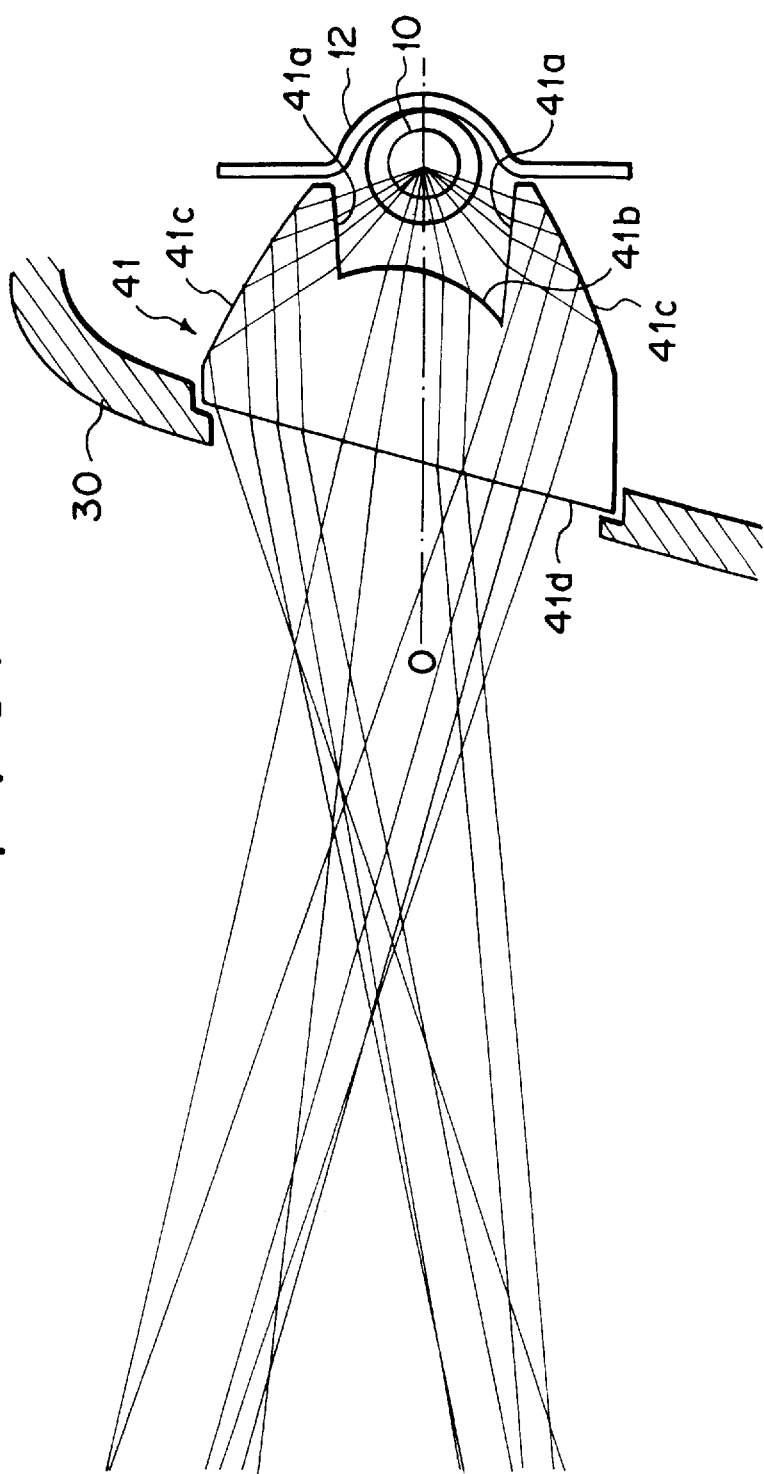
FIG. 7 is a side view of an important part of a stroboscope in accordance with a fourth embodiment of the present invention.

A fourth embodiment of the present invention will be described with reference to FIG. 7, hereinbelow.

The stroboscope of this embodiment includes a prism 41 which comprises a first light incident surface 41a, a second light incident surface 41b which is a positive refracting surface, a total reflection surface 41c and a light emanating surface 41d and doubles as a protector for protecting a light source 10 like the prism 31 in the third embodiment. The light emanating surface 41d of the prism 41 is inclined relative to the optical axis O of projected light to conform to an inclined front face of the camera body 30.

In the third embodiment described above, there is a tendency that projected light leans downward. In the fourth embodiment, the upper total reflection surface 41c is relatively largely inclined with the lower total reflection surface 41 inclined relatively small and at the same time also the second light incident surface 41b is inclined relative to the optical axis O. With this arrangement, the aforesaid lean of the projected light is corrected as can be seen from comparison of FIG. 6 and FIG. 7.

Figure 8:
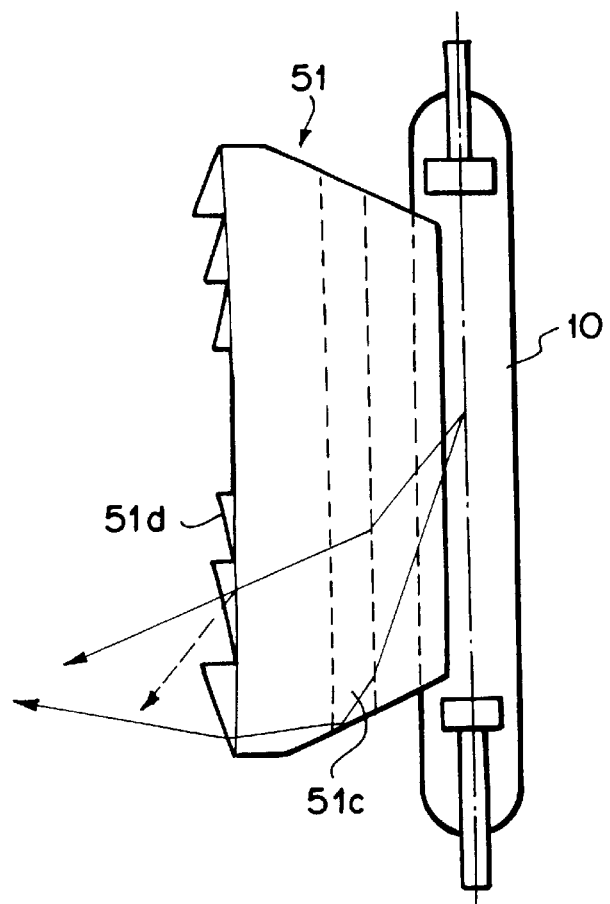
FIG. 8 is a plan view of a stroboscope in accordance with a fifth embodiment of the present invention.
Figure 9:
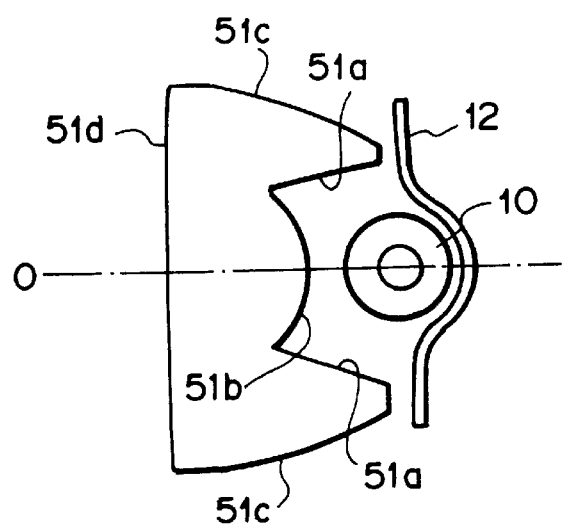
FIG. 9 is a side view of the stroboscope in accordance with the fifth embodiment of the present invention.
Figure 10:
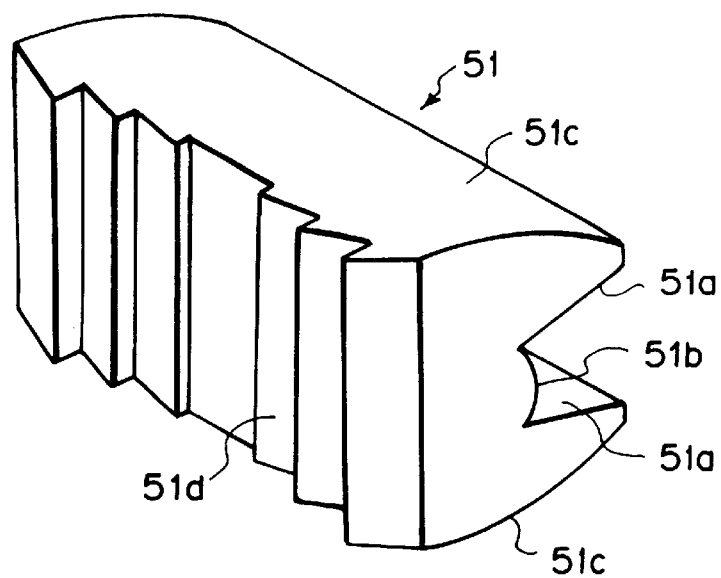
FIG. 10 is a perspective view of a part of the stroboscope in accordance with the fifth embodiment of the present invention.

A fifth embodiment of the present invention will be described with reference to FIGS. 8 to 10, hereinbelow. In FIG. 8, the reflecting mirror 12 is omitted.

The stroboscope of this embodiment includes a prism 51 which comprises a first light incident surface 51a, a second light incident surface 51b which is a positive refracting surface, a total reflection surface 51c and a light emanating surface 51d. The light emanating surface 51d is in the form of a Fresnel lens having vertical grooves.

With this shape of the light emanating surface 51d, light from a light source 10 in the form of a linear tube is condensed in the longitudinal direction of the light source 10, whereby a desired distribution of light can be obtained. Depending on the shape of the Fresnel lens, it is possible to diverge light from a linear light source in the longitudinal direction thereof.

Figure 11:
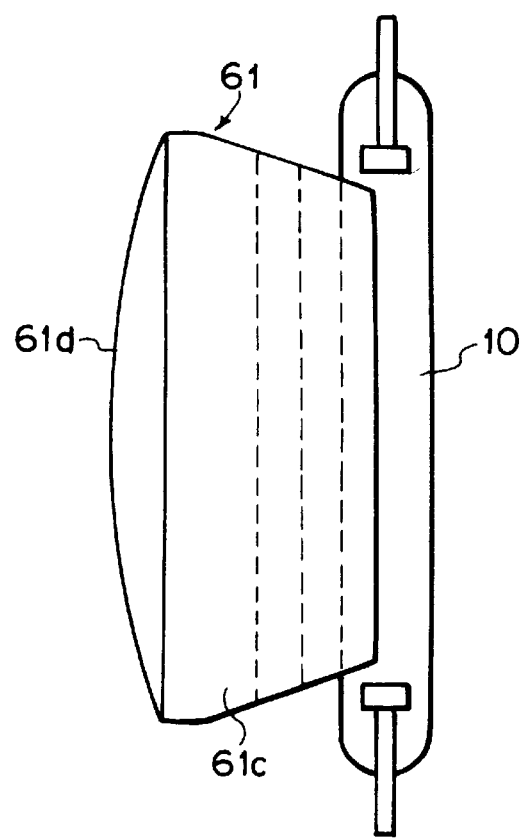
FIG. 11 is a plan view of a stroboscope in accordance with a sixth embodiment of the present invention.

A sixth embodiment of the present invention will be described with reference to FIG. 11, hereinbelow. Though not shown, a reflecting mirror 12 similar to those employed in the aforesaid embodiments is provided also in this embodiment. In this embodiment, a prism 61 having a light emanating surface 61d in the form of a cylindrical lens is employed. With this arrangement, light from a light source 10 in the form of a linear tube is condensed in the longitudinal direction of the light source 10, whereby a desired distribution of light can be obtained. Depending on the shape of the cylindrical lens, it is possible to diverge light from a linear light source in the longitudinal direction thereof.

Figure 12:
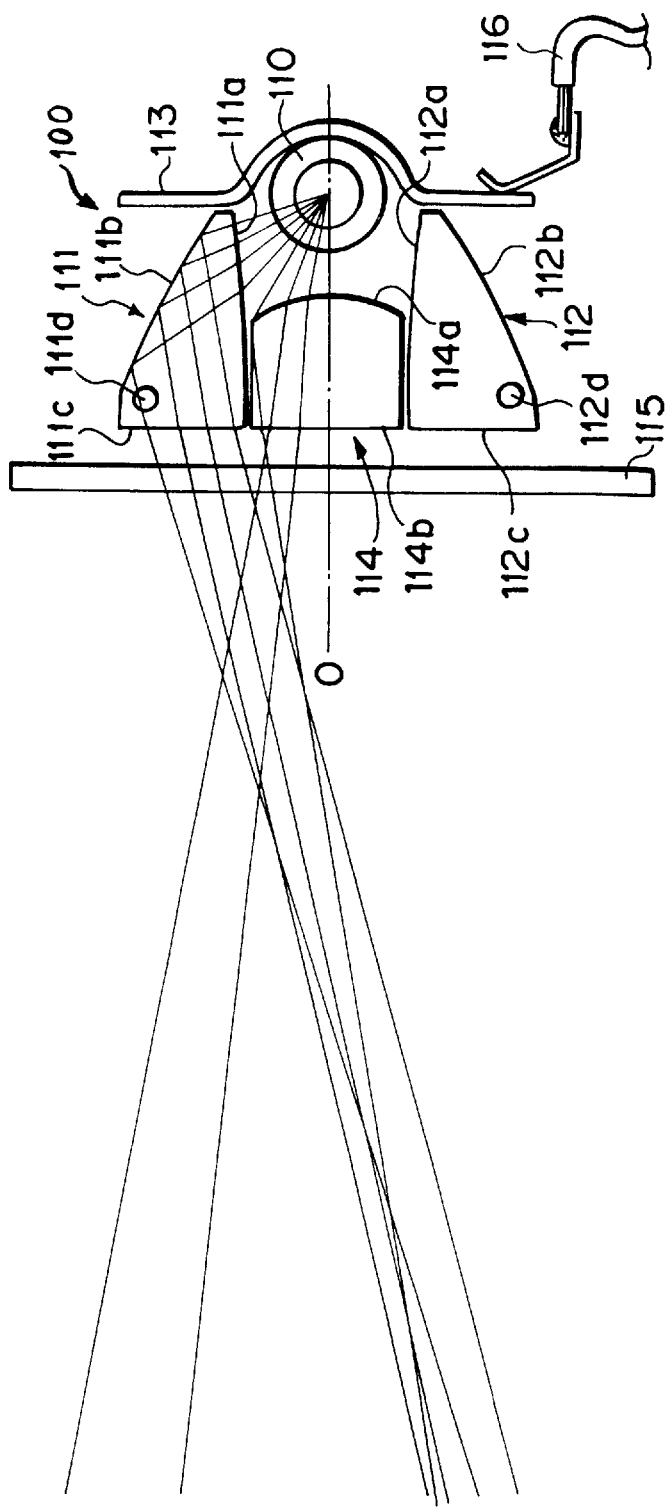
FIG. 12 is a side view of a stroboscope of in accordance with a seventh embodiment of the present invention in a state where the projecting angle is wide.
Figure 14:
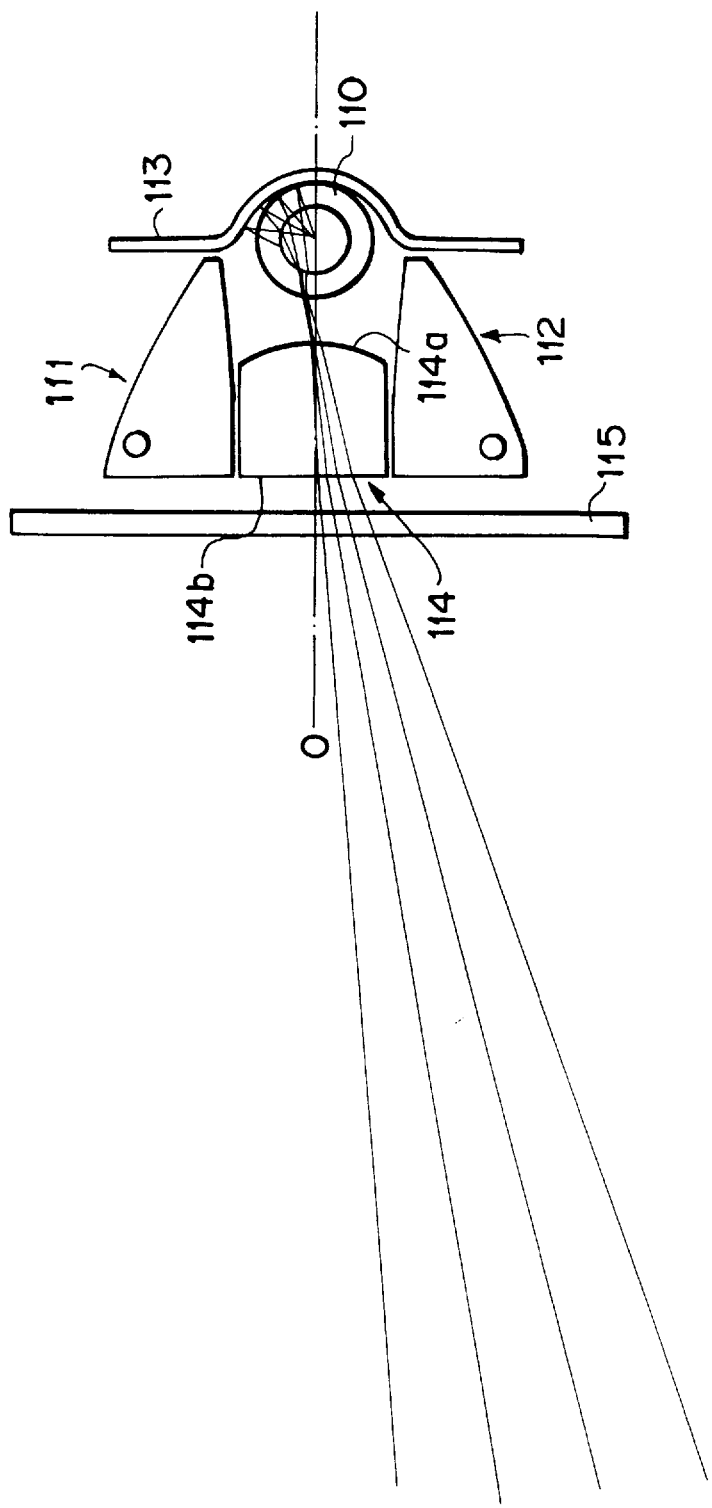
FIG. 14 is a side view similar to FIG. 12 but showing the paths of light different from those shown in FIG. 12.

A seventh embodiment of the present invention will be described with reference to FIGS. 12 to 14, hereinbelow. In FIGS. 12 to 14, a stroboscope in accordance with the seventh embodiment of the present invention comprises a linear light source 110 which may be, for instance, a xenon lamp, a pair of transparent prisms 111 and 112 which are disposed forward of the center of the light source 110 and extend in the longitudinal direction of the light source 110, a reflecting mirror 113 which covers the rear and the side of the light source 110, a cylindrical lens 114 which extends in the longitudinal direction of the light source 110 and is disposed forward of the light source 110 between the prisms 111 and 112 and a dust cover 115 disposed forward of the cylindrical lens 114 and the prisms 111 and 112. In FIG. 12, reference numeral 116 denotes a trigger for controlling emission of light.

The upper prism 111 comprises a light incident surface 111a, a total reflection surface 111b, a light emanating surface 111c and a pivot pin 111d extending in the longitudinal direction of the prism 111. The lower prism 112 also comprises a light incident surface 112a, a total reflection surface 112b, a light emanating surface 112c and a pivot pin 112d extending in the longitudinal direction of the prism 112. The total reflection surfaces 111b and 112b may be, for instance, an ellipse, an arc, a combination of a plurality of arcs, a flat or a combination of two or more of these shapes in cross-section. The reflecting mirror 113 may be formed, for instance, of an aluminum plate or a molded member deposited with aluminum. The reflecting mirror 113 may be, for instance, an ellipse, a hyperbola, an arc, a combination of a plurality of arcs, or a combination of two or more of these shapes in cross-section. The cylindrical lens 114 has a light incident surface 114a which is a positive refracting surface and a light emanating surface 114b.

As shown in FIGS. 12 and 13, light emanating mainly forward from the light source 110 enters the cylindrical lens 114, is condensed by the cylindrical lens 114 in a plane perpendicular to the longitudinal axis of the light source 110 and emanates forward to illuminate an object through the dust cover 115. Light emanating forward upward from the light source 110 enters the prism 111 through the light incident surface 111a and is reflected in total reflection by the total reflection surface 111b. The light reflected by the total reflection surface 111b emanates forward through the light emanating surface 111c and impinges upon an object diagonally opposed to the reflecting point across the optical axis O of projected light, that is, a lower object. Though not shown in FIGS. 12 and 13, light emanating forward downward from the light source 110 enters the prism 112 through the light incident surface 112a and is reflected in total reflection by the total reflection surface 112b. The light reflected by the total reflection surface 112b emanates forward through the light emanating surface 112c and impinges upon an object diagonally opposed to the reflecting point across the optical axis O of projected light, that is, an upper object.

The prisms 111 and 112 are rotatable respectively about the pivot pins 111d and 112d, and are rotated in response, for instance, to operation of a taking zoom lens of the camera (not shown) or are manually rotated. When the zoom lens is set to a wider angle, the prisms 111 and 112 are set to the position shown in FIG. 12 and when the zoom lens is on the telephoto side, the prisms 111 and 112 are set to the position shown in FIG. 13.

FIG. 15 shows the relation between the light projecting area by the stroboscope of this embodiment on an object surface P and angle of view of the zoom lens. In FIG. 15 the area indicated at W corresponds to the angle of view when the zoom lens is set to the wide angle end (will be referred to as "the wide-angle area", hereinbelow) and the area indicated at T corresponds to the angle of view when the zoom lens is set to the telephoto (will be referred to as "the tele-angle area", hereinbelow).

When the prisms 111 and 112 are in the position shown in FIG. 12, the light emanating from the cylindrical lens 114 illuminates the area indicated at 101 in FIG. 15, the light emanating from the upper prism 111 illuminates the area indicated at 102 and the light emanating from the lower prism 112 illuminates the area indicated at 103. The area 101 is slightly wider than the tele-angle area T in the direction in which the projecting angle is changed (the Y-direction) and is slightly wider than the wide-angle area W in the direction perpendicular to the direction in which the projecting angle is changed (the X-direction). The area 102 is slightly wider than the wide-angle area W in the X-direction and deviates downward from the tele-angle area T. The area 103 is slightly wider than the wide-angle area W in the X-direction and deviates upward from the tele-angle area T.

Figure 16:
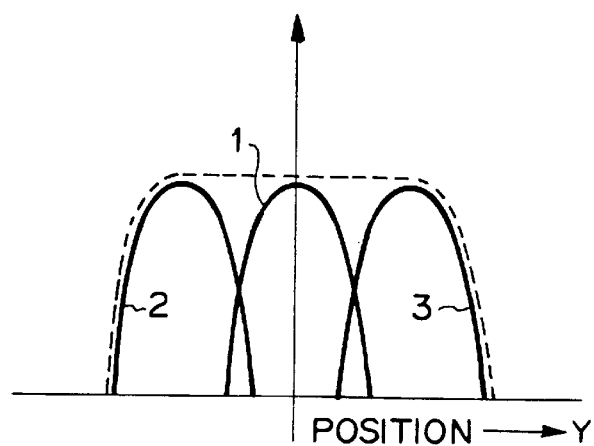
FIG. 16 is a view showing a distribution of illuminance in a wide projecting angle state of the stroboscope.

Thus when the zoom lens of the camera is set to wide angle, the light emanating from the prisms 111 and 112 and the cylindrical lens 114 illuminates an area which substantially coincides with the wide-angle area. FIG. 16 shows the distribution of illuminance in the Y-direction in this state. In FIG. 16, curves 101, 102 and 103 respectively show the distribution of illuminance in the areas 101, 102 and 103 shown in FIG. 15. The distribution of illuminance in the overall illuminated area is obtained by combining the distributions of illuminance in the areas 101, 102 and 103 and is as shown by the dashed line in FIG. 16.

When the zoom lens is set to the telephoto side, the upper prism 111 is rotated about the pivot pin 111d clockwise in FIG. 12 to the position shown in FIG. 13 and the lower prism 111 is rotated about the pivot pin 112d counterclockwise in FIG. 12 to the position shown in FIG. 13.

In the state shown in FIG. 13, the light emanating from the cylindrical lens 114 illuminates the area 101 in FIG. 15 as in the state shown in FIG. 12. As the prism 111 is rotated toward the position shown in FIG. 13, the light emanating from the upper prism 111 gradually changes its direction to reduce the angle which it makes with the optical axis O and illuminates an area substantially the same as the area 101 in the state shown in FIG. 13. Similarly the light emanating from the lower prism 112 illuminates an area substantially the same as the area 101 in the state shown in FIG. 13.

Figure 17:
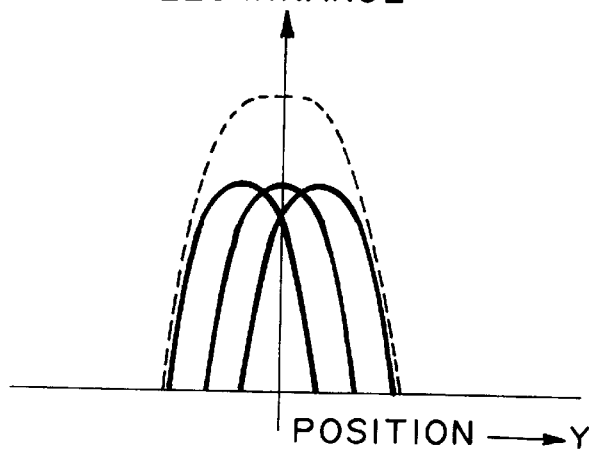
FIG. 17 is a view showing a distribution of illuminance in a narrow projecting angle state of the stroboscope.

Thus when the zoom lens is set to the telephoto end, the light emanating from the prisms 111 and 112 and the cylindrical lens 114 illuminates an area which substantially coincides with the tele-angle area in the Y-direction and substantially coincides with the wide-angle area in the X-direction, whereby the illuminance of the projected area is increased. FIG. 17 shows the distribution of illuminance in the Y-direction in this state. In FIG. 17, curves 101, 102 and 103 respectively show the distribution of illuminance in the areas 101, 102 and 103 shown in FIG. 15. The distribution of illuminance in the overall illuminated area is obtained by combining the distributions of illuminance in the areas 101, 102 and 103 and is as shown by the dashed line in FIG. 17.

Figure 18:
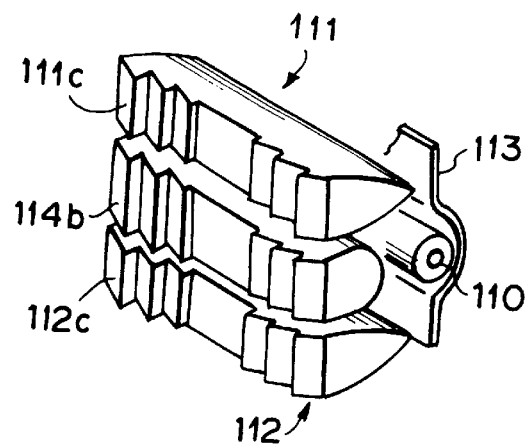
FIG. 18 is a perspective view of modifications of the prisms and the lens which can be employed in the present invention.

Though in the seventh embodiment, the light emanating surfaces 111c and 112c of the prisms 111 and 112 and the light emanating surface 114b of the cylindrical lens 114 are flat, these light emanating surfaces 11c, 112c and 114b may be in the form of a Fresnel lens having vertical grooves as shown in FIG. 18 so that light is condensed in a direction perpendicular to the direction in which the projecting angle is to be changed.

It is preferred that end faces of the prisms 111 and 112 opposed to the cylindrical lens 114 and end faces of the cylindrical lens 114 opposed to the prisms 111 and 112 be mirror-finished so that light passing through the prisms 111 and 112 and the cylindrical lens 114 is reflected in total reflection.

In this particular embodiment, since light emanating rearward from the light source 110 is reflected by the reflecting mirror 113 and mainly enters the cylindrical lens 114 as shown in FIG. 14, the light condensing efficiency is kept high. However the reflecting mirror 113 may be arranged so that the light reflected by the reflecting mirror 113 mainly enters the prisms 111 and 112.

Further the light source 110 may be disposed to extend vertically so that the projecting angle is changed in the X-direction in FIG. 15.

Figure 21:
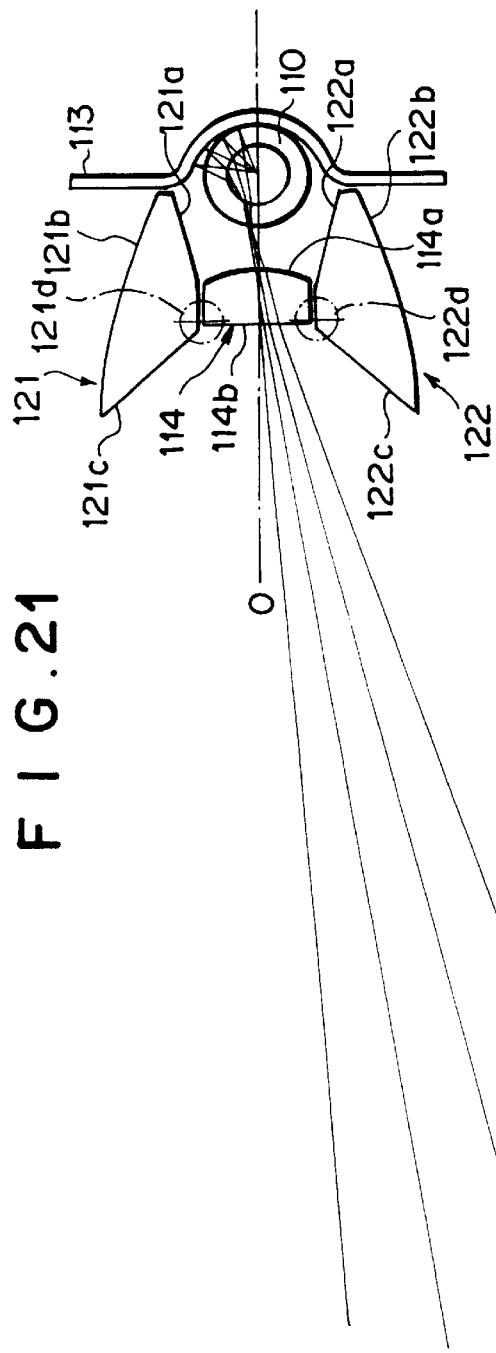
FIG. 21 is a side view similar to FIG. 19 but showing the paths of light different from those shown in FIG. 19.
Figure 22:
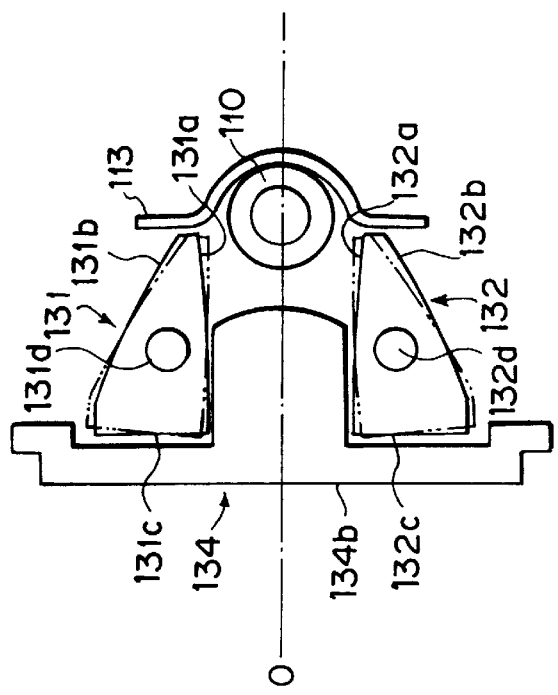
FIG. 22 is a side view showing an important part of a stroboscope in accordance with a ninth embodiment of the present invention.

An eighth embodiment of the present invention will be described with reference to FIGS. 19 to 21, hereinbelow. The stroboscope of this embodiment includes prisms 121 and 122 which are different from those employed in the seventh embodiment. That is, in this embodiment, the upper prism 121 has a light incident surface 121a, a total reflection surface 121b and a light emanating surface 121c and is supported for rotation about a pivot pin 121d which is disposed near the front edge of the surface opposed to the cylindrical lens 114. Similarly the lower prism 122 has a light incident surface 122a, a total reflection surface 122b and a light emanating surface 122c and is supported for rotation about a pivot pin 122d which is disposed near the front edge of the surface opposed to the cylindrical lens 114.

These prisms 121 and 122 are relatively small in inclination of the total reflection surfaces 121b so that the height $y_p$ at the front end of the stroboscope can be reduced. In order to prevent the projecting angle from becoming too large, the light emanating surfaces 121c and 122c are inclined so that the emanating light is refracted in a direction in which the angle of the light to the optical axis O decreases. This arrangement is advantageous in reducing the size of the stroboscope.

A ninth embodiment of the present invention will be described with reference to FIGS. 22 to 25, hereinbelow.

The stroboscope of this embodiment includes upper and lower prisms 131 and 132 and a cylindrical lens 134. The upper prism 131 has a light incident surface 131a, a total reflection surface 131b and a light emanating surface 131c and is supported for rotation about a pivot pin 131d. Similarly the lower prism 132 has a light incident surface 132a, a total reflection surface 132b and a light emanating surface 132c and is supported for rotation about a pivot pin 132d.

The front end portion of the cylindrical lens 134 is extended in the vertical direction across the light emanating surfaces 131c and 132c of the prisms 131 and 132. In the seventh embodiment of the present invention described above, gaps are formed between the cylindrical lens 114 and the prisms 111 and 112 and the dust cover 115 is required in order to prevent entrance of dust into the gaps. In this embodiment, however, no dust cover is necessary since the cylindrical lens 134 doubles as a dust cover. Accordingly, the light emanating from the cylindrical lens 134 need not pass through a dust cover and a larger amount of light can be projected from the stroboscope of this embodiment.

Figure 23:
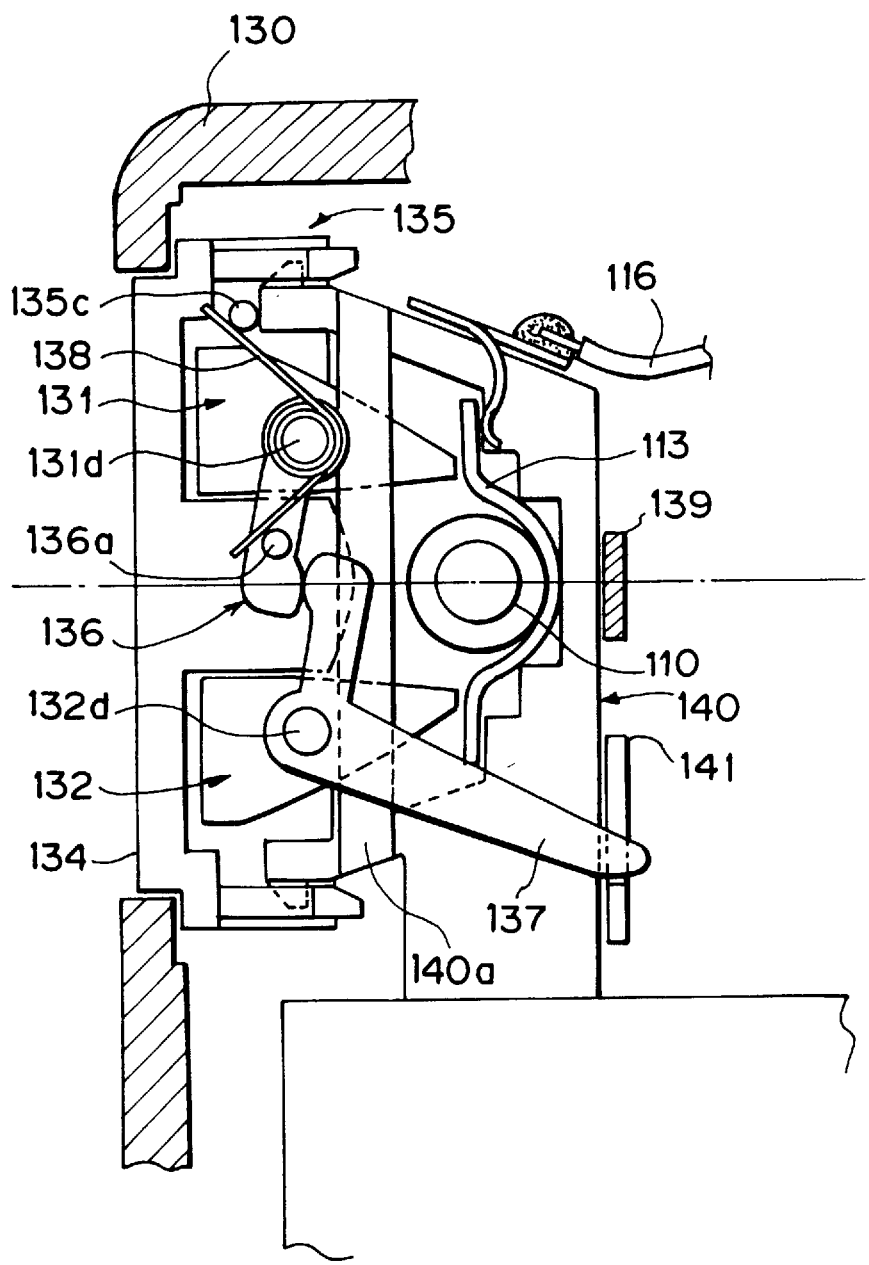
FIG. 23 is a side view partly cutaway of the stroboscope of the ninth embodiment as incorporated in a camera body in a state where the projecting angle is wide.
Figure 24:
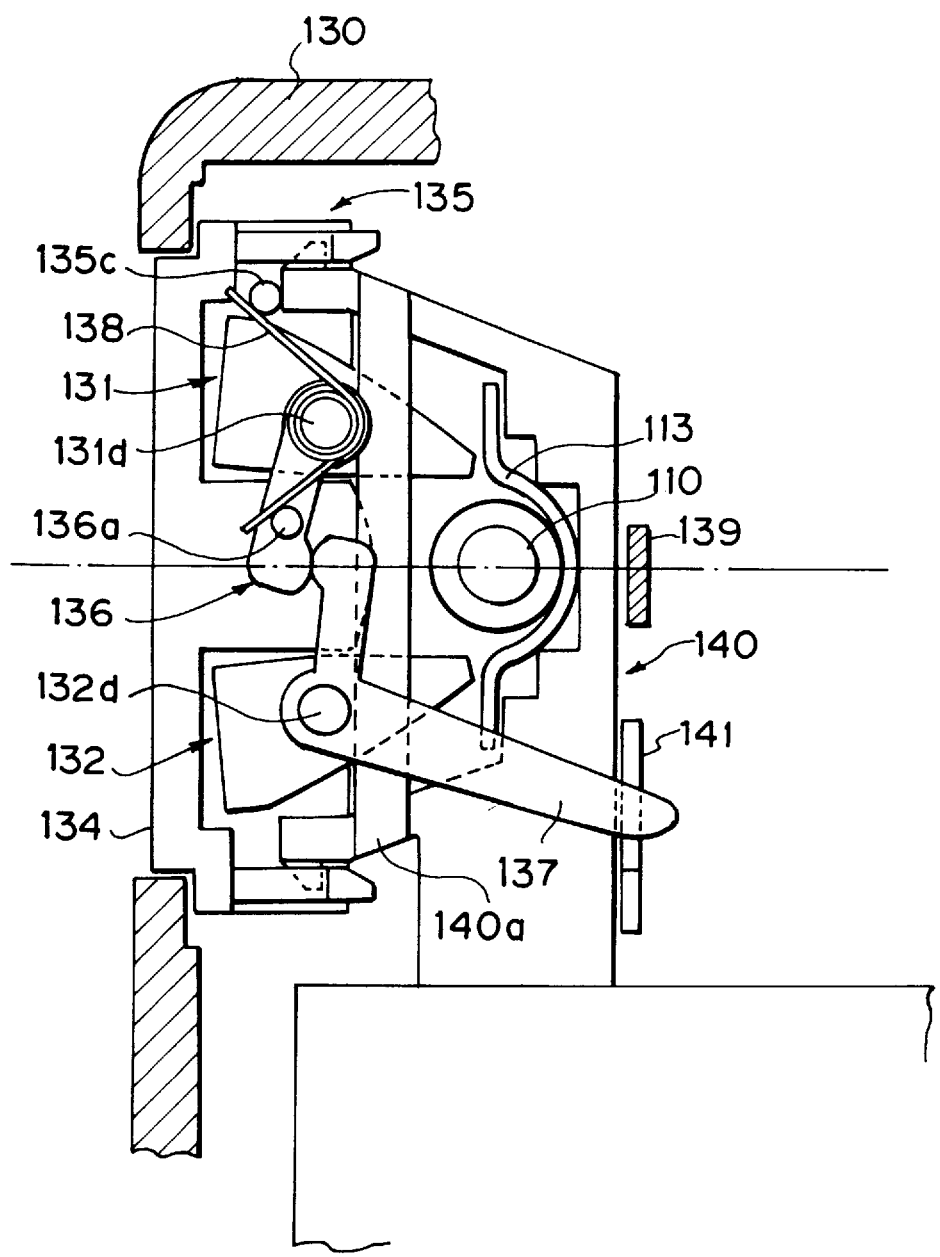
FIG. 24 is a side view partly cutaway of the stroboscope of the ninth embodiment as incorporated in a camera body in a state where the projecting angle is narrow.

FIGS. 23 and 24 shows the stroboscope of the ninth embodiment as incorporated in a camera body. FIG. 23 shows a state in which the stroboscope is set for a wide projecting angle and FIG. 24 shows a state in which the stroboscope is set for a narrow projecting angle.

The cylindrical lens 134 is mounted in a lens frame 135 and the lens frame 135 is fixed to a camera body 130. The lens frame 135 may be formed integrally with the cylindrical lens 134. In FIGS. 23 and 24, a side plate of the lens frame 135 on the near side is omitted. A pair of recesses 135a are formed in a upper portion of the rear side of the lens frame 135 and the upper prism 131 is disposed in the lens frame 135 with the pivot pin 131d received in the recesses 135a. A pair of recesses 135b are formed in a lower portion of the rear side of the lens frame 135 and the lower prism 132 is disposed in the lens frame 135 with the pivot pin 132d received in the recesses 135b. A casing 140 is mounted on the rear side of the lens frame 135 and pin holder portions 140a on opposite sides of the casing 140 cover the recesses 135a and 135b, whereby the prisms 131 and 132 are supported for rotation respectively about the pivot pins 131d and 132d.

An arm 136 is fixed to the pivot pin 131d of the upper prism 131 at one end of the pivot pin 131d and a prism drive lever 137 adapted to be engaged with the arm 136 is fixed to the pivot pin 132d of the lower prism 132 at one end of the pivot pin 132d. A torsion spring 138 is fitted on the pivot pin 131d with its one end in engagement with a projection 135c on the lens frame 135 and its the other end in engagement with a projection 136a on the arm 136, whereby the upper prism 131 is urged counterclockwise about the pivot pin 131d. The prism drive lever 137 and the lower prism 132 are urged clockwise about the pivot pin 132d under the force of the torsion spring 138 by way of the arm 136.

A trigger 116 is mounted on the casing 140 and the light source 110 and the reflecting mirror 113 are mounted on the casing 140 by a silicone band 139. A pair of pins 140b and 140c project rearward from the rear side of the casing 140 and a cam plate 141 is disposed on the rear side of the casing 140 with the pins 140b and 140c received in elongated holes 141b and 141c. That is, the cam plate 141 is moved relative to the casing 140 in the longitudinal direction of the elongated holes 141b and 141c.

The cam plate 141 is provided with an inclined cam surface 141a formed in the upper surface thereof on one end portion thereof and a rack 141d formed in the lower surface thereof on the other end portion thereof. The lower end portion of the prism drive lever 137 is in resilient abutment against the can surface 141a. The rack 141d is in mesh with a gear 143a which is rotated by a zooming ring 142 for zooming a zoom lens (not shown) of the camera.

Figure 25:
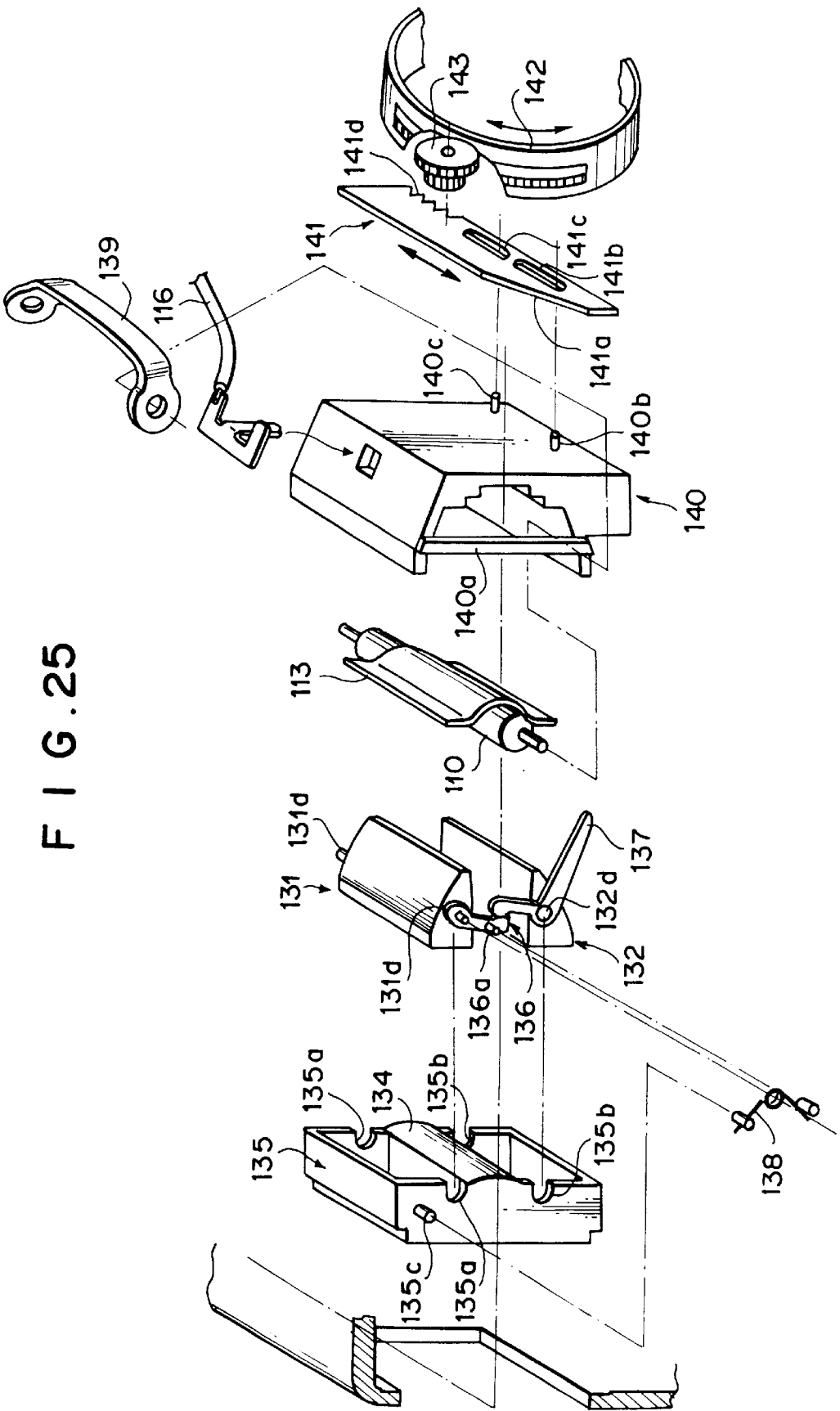
FIG. 25 is an exploded perspective of the stroboscope of the ninth embodiment.

When the zooming ring 142 is in a position where the zoom lens of the camera is in a wide side position, the cam plate 141 is in a rightward position as seen in FIG. 25. In this state, the lower end of the prism drive lever 137 in abutment against the cam surface 141a is in a lower position where the prisms 131 and 132 are in the position shown in FIG. 23 and a wide projecting angle is obtained.

When the zooming ring 142 is rotated to set the zoom lens in a tele side position, the cam plate 141 is moved leftward in FIG. 25 and the lower end of the prism drive lever 137 is moved upward, whereby the prisms 131 and 132 are moved to the position shown in FIG. 24 where a narrow projecting angle is obtained.

A tenth embodiment of the present invention will be described with reference to FIGS. 26A, 26B, and 27, hereinbelow. The stroboscope of this embodiment differs from that of the seventh embodiment described above in that the cylindrical lens 114 is movable in the direction of the optical axis O. FIG. 26A shows the stroboscope of this embodiment in a state where the projecting angle is wide and FIG. 26B shows the stroboscope of the seventh embodiment in a state where the projecting angle is wide. Further FIG. 27 shows the stroboscope of this embodiment in a state where the projecting angle is narrow.

In order to obtain an especially wide projecting angle, the prisms 111 and 112 are rotated respectively counterclockwise and clockwise beyond the position shown in FIG. 26B. This moves the area illuminated by the light from the upper prism 111 (the area 2 in FIG. 15) and the area illuminated by the light from the lower prism 112 (the area 3 in FIG. 15) away from the center of angle of view, thereby increasing the projecting angle.

However such a movement of the prisms 111 and 112 separates the areas 2 and 3 from the area 1 and creates a dark areas between the area 1 and the areas 2 and 3. When the cylindrical lens 114 is moved toward the light source 110, the area 1 is widened in Y-direction in FIG. 15 to cancel the dark areas.

When the cylindrical lens 114 is moved away from the light source 110 with the prisms 111 and 112 in a position where an especially narrow projecting angle is obtained as shown in FIG. 27, the area 1 is narrowed in Y-direction and a further narrow projecting angle is obtained.

Generally if a lens is moved away from a light source, the amount of incident light to the lens is reduced. However in this embodiment, since light which comes not to enter the cylindrical lens 114 when the cylindrical lens 114 is moved away from the light source 110 (e.g., light indicated at a in FIG. 27) then comes to enter the prisms 111 and 112, the efficiency of utilization of light is not deteriorated.

An eleventh embodiment of the present invention will be described with reference to FIG. 28, hereinbelow. The stroboscope of this embodiment differs from that of the seventh embodiment in which an additional function is given to the prism rotating mechanism. For example, a parallax correction lever of the camera which is operated when a near object is to be photographed is mechanically connected to the prism rotating mechanism to rotate the prisms 111 and 112 in the same direction when a near object is to be photographed. For example, when the prisms 111 and 112 are rotated counterclockwise for wide angle photographing, the projected area is shifted downward as shown in FIG. 28.

What is claimed is:

1. A lighting unit for controlling the direction of emitted light comprising:
    a light source having a transparent portion which is approximately spherical in shape;
    a refracting solid disposed adjacent to the light source such that the refracting solid is entirely forward in a light emanating direction of a center of the transparent portion of the light source, the refracting solid comprising:
        a first light incident surface having a frustoconical shape whose axis of symmetry is an optical axis of the lighting unit, a larger circumference of which faces the light source, and a smaller circumference of which faces away from the light source;
        a second light incident surface having a smoothly curved face and a clearly defined, circular perimeter defined by the smaller circumference of the first light incident surface, the second light incident surface presenting a convex face to the light source;
        a total reflecting surface surrounding the first and second light incident surfaces; and
        a light emanating surface; and
    a reflecting mirror disposed adjacent to the light source and opposite the refracting solid;
    wherein light emanated from the light source toward the reflecting mirror is reflected toward the refracting solid, light reaching the first incident surface is refracted toward the total reflecting surface and reflected toward the light emanating surface, light reaching the second light incident surface is refracted toward the emanating surface;
    wherein the first and second light incident surfaces represent the only refracting surfaces receiving light from the light source; and
    wherein the first light incident surface is angled with respect to the optical axis in the range of 2° to 13°.

2. A lighting unit as defined in claim 1, wherein 20 relationships $D/2 \leq x_r \leq D$ and $D < y_r 2D$ are satisfied, wherein $x_r$ and $y_r$ respectively represent a depth and width of an effective area of the reflecting mirror and D represents a diameter of the light source.

3. A lighting unit as defined in claim 1, in which a diameter of the larger circumference is at least equal to a diameter of the light source and at most twice the diameter of the light source.

4. A lighting unit as defined in claim 1, wherein the light emanating surface is exposed as a part of an outer surface of a camera.

5. A lighting unit as defined in claim 1, wherein the light emanating surface is planar.

6. A lighting unit as defined in claim 5, wherein the light emanating surface is disposed perpendicular to the optical axis.

7. A lighting unit for controlling the direction of emitted light comprising:
    an elongated light source;
    a refracting solid disposed adjacent to the light source such that the refracting solid is entirely forward in a light emanating direction of a lateral center of the light source, the refracting solid comprising:
        two planar first light incident surfaces, each having a forward edge and a rear edge being, respectively, furthest from and nearest to the light source;

a second light incident surface having a smoothly curved face and two opposing, clearly defined straight edges, each of the edges also defining a respective said forward edge, the second light incident surface presenting a convex face to the light source, an optical plane being defined as passing equidistant between the first light incident surfaces as well as through lengthwise centerlines of both the second light incident surface and the elongated light source;

a total reflecting surface outside of the first and second light incident surfaces; and a light emanating surface; and a reflecting mirror disposed adjacent to the light source and opposite the refracting solid;

wherein light emanated from the light source toward the reflecting mirror is reflected toward the refracting solid, light reaching the first incident surface is refracted toward the total reflecting surface and reflected toward the light emanating surface, light reaching the second light incident surface is refracted toward the emanating surface;

wherein the first and second light incident surfaces represent the only refracting surfaces receiving light from the light source; and wherein each of the first light incident surfaces is angled with respect to the optical plane in the range of 2° to 13°.

8. A lighting unit as defined in claim 7, wherein relationships $D/2 \leq x_r \leq D$ and $D < y_r \leq 2D$ are satisfied, wherein $x_r$ and $y_r$ respectively represent a depth and width of an effective area of the reflecting mirror and D represents a diameter of the light source.

9. A lighting unit as defined in claim 7, in which the respective rear edges are separated by a distance which is at least equal to a diameter of the light source and at most twice the diameter of the light source.

10. A lighting unit as defined in claim 7, wherein the light emanating surface is exposed as a part of an outer surface of a camera.

11. A lighting unit as defined in claim 7, wherein the light emanating surface is planar.

12. A lighting unit as defined in claim 11, wherein the light emanating surface is disposed perpendicular to the optical plane.

13. A lighting unit as defined in claim 1, wherein the first light incident surface is angled with respect to the optical axis in the range of 2° to 5°.

14. A lighting unit as defined in claim 7, wherein the first light incident surface is angled with respect to the optical axis in the range of 2° to 5°.

* * * * *